(12) United States Patent
Weaver et al.

(10) Patent No.: US 8,404,780 B2
(45) Date of Patent: Mar. 26, 2013

(54) ARTICLES COMPRISING NONPOLAR POLYOLEFIN AND POLYURETHANE, AND METHODS FOR THEIR PREPARATION AND USE

(75) Inventors: Laura B. Weaver, Lake Jackson, TX (US); Ashish Batra, Lake Jackson, TX (US); Patricia Ansems, Lake Jackson, TX (US); Gary M. Strandburg, Mt. Pleasant, MI (US); Matthew J. Kalinkowski, Freeland, MI (US)

(73) Assignee: Dow Global Technologies LLC, Midland, MI (US)

( * ) Notice: Subject to any disclaimer, the term of this patent is extended or adjusted under 35 U.S.C. 154(b) by 350 days.

(21) Appl. No.: 12/446,719

(22) PCT Filed: Oct. 31, 2007

(86) PCT No.: PCT/US2007/083141
§ 371 (c)(1),
(2), (4) Date: Apr. 22, 2009

(87) PCT Pub. No.: WO2008/057878
PCT Pub. Date: May 15, 2008

(65) Prior Publication Data
US 2009/0275690 A1 Nov. 5, 2009

Related U.S. Application Data

(60) Provisional application No. 60/863,887, filed on Nov. 1, 2006, provisional application No. 60/894,353, filed on Mar. 12, 2007, provisional application No. 60/952,254, filed on Jul. 27, 2007, provisional application No. 60/952,266, filed on Jul. 27, 2007.

(51) Int. Cl.
*C08L 53/00* (2006.01)
*C08L 23/08* (2006.01)

(52) U.S. Cl. ........................ 525/92 C; 525/130; 525/455

(58) Field of Classification Search .................. 525/123, 525/125
See application file for complete search history.

(56) References Cited

U.S. PATENT DOCUMENTS

| 2,929,800 A | 3/1960 | Hill, Jr. |
| 2,948,691 A | 8/1960 | Windemuth et al. |
| 3,394,164 A | 7/1968 | McClellan et al. |
| 3,493,634 A | 2/1970 | Kolycheck et al. |

(Continued)

FOREIGN PATENT DOCUMENTS

| EP | 0347794 | 12/1989 |
| EP | 0190889 | 4/1993 |

(Continued)

OTHER PUBLICATIONS

Wild, L., et al., J. Polym. Sci, 20, 441-455 (1982).

(Continued)

*Primary Examiner* — Randy Gulakowski
*Assistant Examiner* — Mike M Dollinger
(74) *Attorney, Agent, or Firm* — Whyte Hirschboeck Dudek SC

(57) ABSTRACT

The adhesion between a low surface energy (i.e., nonpolar) material, e.g., a polyolefin such as polyethylene, and a high surface energy (i.e., polar) material, e.g., a polyester, polyurethane, polycarbonate or polylactic acid, is promoted by blending with the nonpolar material typically from 15 to less than 50 wt % of a diol-based thermoplastic polyurethane (d-TPU), e.g., a polydiene diol-based TPU, based on the combined weight of the nonpolar material and the d-TPU. The promoted adhesion allows for the effective painting, printing, over-molding or HF-welding of a nonpolar substrate, e.g., a polyolefin film, with a polar coating, e.g., a paint, ink, etc. Aqueous dispersions can also be made from the blend of nonpolar material and d-TPU.

17 Claims, 2 Drawing Sheets

| SOURCE OF CROSS-CUT AREA ITEM WHICH TAKING HAS OCCURRED EXAMPLE FOR A PARALLEL CUT | NONE | | | | | GREATER THAN 65% |
|---|---|---|---|---|---|---|
| CLASSIFICATION | 5 | 4 | 3 | 2 | 1 | 0 |

U.S. PATENT DOCUMENTS

| | | | |
|---|---|---|---|
| 3,620,905 A | 11/1971 | Ahramjian | |
| 3,642,964 A | 2/1972 | Rausch, Jr. et al. | |
| 3,644,457 A | 2/1972 | König et al. | |
| 3,645,992 A | 2/1972 | Elston | |
| 3,883,571 A | 5/1975 | Allport et al. | |
| 3,963,679 A | 6/1976 | Ullrich et al. | |
| 4,031,026 A | 6/1977 | Ibbotson | |
| 4,039,593 A | 8/1977 | Kamienski et al. | |
| 4,057,595 A | 11/1977 | Rauner et al. | |
| 4,076,698 A | 2/1978 | Anderson et al. | |
| 4,115,429 A | 9/1978 | Reiff et al. | |
| 4,118,411 A | 10/1978 | Reiff et al. | |
| 4,131,604 A | 12/1978 | Szycher et al. | |
| 4,169,196 A | 9/1979 | Ehrlich et al. | |
| 4,245,081 A | 1/1981 | Quiring et al. | |
| 4,299,347 A | 11/1981 | Rougier et al. | |
| 4,371,684 A | 2/1983 | Quiring et al. | |
| 4,379,904 A | 4/1983 | Ehrlich et al. | |
| 4,385,133 A | 5/1983 | Alberino et al. | |
| 4,447,590 A | 5/1984 | Szycher et al. | |
| RE31,671 E | 9/1984 | Bonk et al. | |
| 4,522,975 A | 6/1985 | O'Connor et al. | |
| 4,523,005 A | 6/1985 | Szycher et al. | |
| 4,621,113 A | 11/1986 | Collins et al. | |
| 4,631,329 A | 12/1986 | Gornowicz et al. | |
| 4,798,081 A | 1/1989 | Hazlitt et al. | |
| 4,883,837 A | 11/1989 | Zabrocki et al. | |
| 4,945,005 A | 7/1990 | Aleckner, Jr. et al. | |
| 4,946,896 A | 8/1990 | Mitsuno et al. | |
| 4,980,108 A * | 12/1990 | Suzuki et al. | 264/134 |
| 4,996,250 A * | 2/1991 | Awad et al. | 523/500 |
| 5,039,755 A | 8/1991 | Chamberlain et al. | |
| 5,126,411 A * | 6/1992 | Rauterkus et al. | 525/455 |
| 5,167,899 A | 12/1992 | Jezic et al. | |
| 5,229,464 A | 7/1993 | Erickson et al. | |
| 5,272,236 A | 12/1993 | Lai et al. | |
| 5,278,272 A | 1/1994 | Lai et al. | |
| 5,346,963 A | 9/1994 | Hughes et al. | |
| 5,414,027 A | 5/1995 | DeNicola, Jr. et al. | |
| 5,424,362 A | 6/1995 | Hwang et al. | |
| 5,464,907 A | 11/1995 | Jelenic et al. | |
| 5,574,091 A * | 11/1996 | Walther et al. | 524/570 |
| 5,614,589 A * | 3/1997 | Niznik et al. | 525/71 |
| 5,623,019 A | 4/1997 | Wiggins et al. | |
| 5,864,001 A | 1/1999 | Masse et al. | |
| 5,902,854 A | 5/1999 | Kelley et al. | |
| 5,986,028 A | 11/1999 | Lai et al. | |
| 6,030,917 A | 2/2000 | Weinberg et al. | |
| 6,054,533 A | 4/2000 | Farkas et al. | |
| 6,054,544 A | 4/2000 | Finlayson et al. | |
| 6,248,540 B1 | 6/2001 | Weinberg et al. | |
| 6,251,982 B1 | 6/2001 | Masse et al. | |
| 6,268,444 B1 | 7/2001 | Klosin et al. | |
| 6,306,658 B1 | 10/2001 | Turner et al. | |
| 6,316,663 B1 | 11/2001 | Guram et al. | |
| 6,335,410 B1 | 1/2002 | Finlayson et al. | |
| 6,362,309 B1 | 3/2002 | Lund | |
| 6,395,671 B2 | 5/2002 | LaPointe et al. | |
| 6,469,099 B1 | 10/2002 | Farah et al. | |
| 6,506,842 B1 | 1/2003 | Heck et al. | |
| 6,723,810 B2 | 4/2004 | Finlayson et al. | |
| 6,825,277 B2 | 11/2004 | Van Issum et al. | |
| 6,897,276 B2 | 5/2005 | Boussie et al. | |
| 6,919,407 B2 | 7/2005 | Tau et al. | |
| 6,953,764 B2 | 10/2005 | Frazier et al. | |
| 7,067,592 B2 | 6/2006 | Chino et al. | |
| 7,355,089 B2 | 4/2008 | Chang et al. | |
| 7,361,694 B2 * | 4/2008 | Strandburg et al. | 521/61 |
| 7,439,276 B2 * | 10/2008 | Strandburg et al. | 521/140 |
| 7,504,347 B2 | 3/2009 | Poon et al. | |
| 7,514,517 B2 | 4/2009 | Hoenig et al. | |
| 7,524,911 B2 | 4/2009 | Karjala et al. | |
| 2001/0006995 A1 * | 7/2001 | Obrecht et al. | 525/123 |
| 2003/0004286 A1 | 1/2003 | Klosin et al. | |
| 2005/0100754 A1 | 5/2005 | Moncla et al. | |
| 2006/0199030 A1 | 9/2006 | Liang et al. | |
| 2006/0199744 A1 | 9/2006 | Walton et al. | |
| 2006/0199872 A1 | 9/2006 | Prieto et al. | |
| 2006/0199887 A1 | 9/2006 | Liang et al. | |
| 2006/0199896 A1 | 9/2006 | Walton et al. | |
| 2006/0199905 A1 | 9/2006 | Hughes et al. | |
| 2006/0199906 A1 | 9/2006 | Walton et al. | |
| 2006/0199908 A1 | 9/2006 | Cheung et al. | |
| 2006/0199910 A1 | 9/2006 | Walton et al. | |
| 2006/0199911 A1 | 9/2006 | Markovich et al. | |
| 2006/0199912 A1 | 9/2006 | Fuchs et al. | |
| 2006/0199914 A1 | 9/2006 | Harris et al. | |
| 2006/0199930 A1 | 9/2006 | LiPi Shan et al. | |
| 2006/0199931 A1 | 9/2006 | Poon et al. | |
| 2006/0199983 A1 | 9/2006 | Kammerhofer et al. | |
| 2008/0220273 A1 | 9/2008 | Weaver | |
| 2009/0163663 A1 | 6/2009 | Qureshi | |
| 2010/0028568 A1 * | 2/2010 | Weaver et al. | 428/17 |
| 2010/0029827 A1 | 2/2010 | Ansems et al. | |
| 2010/0055358 A1 * | 3/2010 | Weaver et al. | 428/17 |
| 2010/0143651 A1 * | 6/2010 | Silvis et al. | 428/141 |
| 2010/0292403 A1 | 11/2010 | Ansems et al. | |

FOREIGN PATENT DOCUMENTS

| | | |
|---|---|---|
| EP | 0643742 | 12/1993 |
| EP | 0754711 | 7/1995 |
| EP | 0994919 | 4/2000 |
| GB | 1446586 | 8/1976 |
| WO | 9406859 | 3/1994 |
| WO | 9627622 | 9/1996 |
| WO | 9902603 | 1/1999 |
| WO | 00/63293 | 10/2000 |
| WO | 0340195 | 5/2003 |
| WO | 2004024740 | 3/2004 |
| WO | 2005008915 | 1/2005 |
| WO | 2005008916 | 1/2005 |
| WO | 2005008917 | 1/2005 |
| WO | 2005090425 A1 | 9/2005 |
| WO | 2005090427 | 9/2005 |
| WO | WO 2005090427 A2 * | 9/2005 |
| WO | 2006035384 | 4/2006 |
| WO | 2006101968 | 9/2006 |
| WO | 2007033115 | 3/2007 |
| WO | 2007033117 | 3/2007 |

OTHER PUBLICATIONS

Ward, J., J. Polym. Sci., Polym. Let., 6, 621 (1968).
Randall, J.C., JMS-RW. Macromol. Chem. Phys., C29, 201-317, 1989.

* cited by examiner

FIG. 1

| CLASSIFICATION | 5 | 4 | 3 | 2 | 1 | 0 |
|---|---|---|---|---|---|---|
| SOURCE OF CROSS-CUT AREA ITEM WHICH TAKING HAS OCCURRED EXAMPLE FOR A PARALLEL CUT | NONE | | | | | GREATER THAN 65% |

ARTICLES COMPRISING NONPOLAR POLYOLEFIN AND POLYURETHANE, AND METHODS FOR THEIR PREPARATION AND USE

REFERENCE TO RELATED APPLICATIONS

This application claims the benefit of U.S. Provisional Application No. 60/863,887, filed on Nov. 1, 2006, and U.S. Provisional Application No. 60/894,353, filed on Mar. 12, 2007, and U.S. Provisional Application No. 60/952,254, filed on Jul. 27, 2007, and U.S. Provisional Application No. 60/952,266, filed on Jul. 27, 2007; each application is fully incorporated herein by reference.

FIELD OF THE INVENTION

This invention relates to compositions comprising nonpolar polyolefin and diol-based polyurethane. In one aspect, the invention relates to a blend of an ethylene/α-olefin copolymer and a diol-based polyurethane while in another aspect, the invention relates to the use of these blends in painting, overmolding, high frequency welding and aqueous dispersions applications. In yet another aspect, the invention relates to the use of these compositions and blends in other applications while in still another aspect, the invention relates to articles made from these compositions and blends.

BACKGROUND OF THE INVENTION

Polyolefins (POs) have many desirable properties, e.g. light weight, durability, low cost, etc., that make them attractive materials of construction for many consumer goods, e.g. interior and exterior automotive parts, decorative fascia for household appliances, and the like. However because of their nonpolar nature, POs do not readily accept paint, primers or decorative print. Most paints, primers and inks are polar in nature, and thus require a surface with some degree of polarity before they can adhere to the surface with any degree of desirable fastness.

Various techniques have been developed to address this problem. One typical and effective technique is applying a primer to the PO. Primer materials are typically compositions containing a maleated and/or halogenated polyolefin and an aromatic or water solvent and while widely recognized as effective, primers are expensive and their application is an extra step in the finishing of the PO article.

Another effective technique is to subject the surface of a PO article to a physical or chemical treatment, such as etching with a chemical abrasive, or irradiating with plasma, or exposing to a corona or flame. While generally effective, these methods are more complex in nature than the application of a primer, and thus more difficult to control in terms of quality and consistency from part to part.

Another technique is to modify the physical and/or chemical properties of the PO either by blending it with other polymers, or by incorporating into it one or more polar groups, or both. For example, U.S. Pat. No. 4,946,896 to Mitsuno, et al. teaches a paintable PO comprising 20-80 wt % (wt %) polypropylene; 5-38 wt % of an ethylene copolymer consisting of ethylene, an ester unit of either alkyl acrylate or methacrylate, and an unsaturated dicarboxylic acid anhydride; and 5-70 wt % ethylene-propylene rubber. U.S. Pat. No. 4,888,391 to Domine, et al. teaches a paintable polyolefin composition comprising a blend of a polyolefin as the continuous phase with an ethylene/acrylate/acrylic acid terpolymer as the discontinuous phase. U.S. Pat. No. 4,945,005 to Aleckner, Jr., et al. teaches paintable POs comprising 2-25 wt % of a copolymer of an ethylenically unsaturated carboxylic acid and ethylene; 3-50 wt % of an ethylene α-olefin copolymer; optionally a crystalline homopolymer or copolymer of propylene; 5-50 wt % of inorganic filler; and 10-35 wt % of a polyethylene or a copolymer of ethylene and α-olefin. EP 0 643 742 A1 teaches a paintable polyethylene comprising at least 50 wt % polyethylene grafted with at least about 0.01 wt %, based on the weight of the polyethylene, of an unsaturated organic compound containing at least one double bond and at least one functional acid group, e.g. maleic anhydride (MAH), and at least one thermoplastic polymer containing polar groups, e.g. polyurethane. U.S. Pat. No. 5,346,963 teaches that substantially linear ethylene polymers grafted with one or more unsaturated organic compounds containing ethylenic unsaturation and a carbonyl group, e.g., MAH, exhibit desirable compatibility and impact properties to various thermoplastic polymer blends. U.S. Pat. No. 5,424,362 teaches a paintable, thermoplastic composition comprising (i) 30-70 wt % of at least one polypropylene or graft-modified polypropylene, (ii) 0-40 wt % of at least one of a non-grafted substantially linear ethylene polymer and a graft-modified substantially linear ethylene polymer, and (iii) 0-50 wt % of an interpolymer of ethylene and an α,β-unsaturated carbonyl with the proviso that the sum of components (i) and (ii) is between about 30-70 wt %.

International Publication No. 2007/033117 relates to ethylene/α-olefin compositions containing at least one ethylene/α-olefin random interpolymer and at least one polydiene diol-based polyurethane, and where the at least one ethylene/α-olefin interpolymer has a PRR from −6 to 75, and a density less than, or equal to, 0.93 g/cc.

Beyond paintability and printability, POs do not adhere well to polar substrates such as polyamide, polyurethane, polycarbonate, acrylonitrile-butadiene-styrene (ABS) and blends of two or more of these materials. This is an important consideration in over-molding and high frequency (HF) welding applications. One response to this adhesion-failure problem has been blending the PO with a zeolite or a polar polymer, e.g., a MAH-grafted polymer or an ethylacrylate polymer.

While these and other modified PO compositions all demonstrate some degree of efficacy, a continuing interest exists in identifying and developing new paintable POs.

SUMMARY OF THE INVENTION

In one embodiment, the invention is an article comprising a first component and a second component, the first component comprising a polar material and the second component comprising a blend of a nonpolar polyolefin (np-PO) and a polydiene-based polyurethane or a polydiol-based polyurethane.

In one embodiment, the second component is a polydiene-based polyurethane. In a preferred embodiment, the polydiene-based polyurethane is a polydiene diol-based polyurethane. In a further embodiment, the polydiene diol-based polyurethane is a polybutadiene diol or polyisoprene diol or a combination thereof, and preferably a polybutadiene diol.

In another embodiment, the second component is a polydiol-based polyurethane. In a further embodiment, the polydiol-based polyurethane is formed from at least one diol made from one or more seed oil triglycerides selected from the group consisting of palmitic, stearic, oleic, linoleic and linolenic acid or ester.

Examples of the polydiol-based polyurethanes include, but are not limited to, polyurethanes formed from polyester polyols and seed oil-based polyols.

In another embodiment, the invention is a film comprising a first layer, the first layer comprising a blend of an np-PO and a polydiene-based polyurethane or polydiol-based polyurethane.

In one embodiment, the polyurethane is a polydiene-based polyurethane. In a preferred embodiment, the polydiene-based polyurethane is a polydiene diol-based polyurethane. In a further embodiment, the polydiene diol-based polyurethane is a polybutadiene diol or polyisoprene diol or a combination thereof, and preferably a polybutadiene diol.

In another embodiment, the polyurethane is a polydiol-based polyurethane. In a further embodiment, the polydiol-based polyurethane is formed from at least one diol made from one or more seed oil triglycerides selected from the group consisting of palmitic, stearic, oleic, linoleic and linolenic acid or ester.

Examples of the polydiol-based polyurethanes include, but are not limited to, polyurethanes formed from polyester polyols and seed oil-based polyols.

In another embodiment, the invention is an aqueous dispersion comprising water and from 30 to 70 wt % solids, based on the total weight of the dispersion, the solids comprising a blend of np-PO and polydiene-based polyurethane or polydiol-based polyurethane, the blend comprising at least 15 wt % polydiene-based polyurethane or polydiol-based polyurethane based on the total weight of the blend, the solids having an average particle size of from 0.4 to 2.5 microns.

In one embodiment, the polyurethane is a polydiene-based polyurethane. In a preferred embodiment, the polydiene-based polyurethane is a polydiene diol-based polyurethane. In a further embodiment, the polydiene diol-based polyurethane is a polybutadiene diol or polyisoprene diol or a combination thereof, and preferably a polybutadiene diol.

In another embodiment, the polyurethane is a polydiol-based polyurethane. In a further embodiment, the polydiol-based polyurethane is formed from at least one diol made from one or more seed oil triglycerides selected from the group consisting of palmitic, stearic, oleic, linoleic and linolenic acid or ester.

Examples of the polydiol-based polyurethanes include, but are not limited to, polyurethanes formed from polyester polyols and seed oil-based polyols.

In another embodiment, the invention is a blend comprising (i) an np-PO of at least one of an ethylene multi-block copolymer and a linear ethylene interpolymer, and (ii) a polydiene-based polyurethane or polydiol-based polyurethane.

In one embodiment, component (ii) is a polydiene-based polyurethane. In a preferred embodiment, the polydiene-based polyurethane is a polydiene diol-based polyurethane. In a further embodiment, the polydiene diol-based polyurethane is a polybutadiene diol or polyisoprene diol or a combination thereof, and preferably a polybutadiene diol.

In another embodiment, component (ii) is a polydiol-based polyurethane. In a further embodiment, the polydiol-based polyurethane is formed from at least one diol made from one or more seed oil triglycerides selected from the group consisting of palmitic, stearic, oleic, linoleic and linolenic acid or ester.

Examples of the polydiol-based polyurethanes include, but are not limited to, polyurethanes formed from polyester polyols and seed oil-based polyols.

In one embodiment, the invention is a method of promoting adhesion between a low surface energy, i.e., nonpolar, PO (np-PO), such as polyethylene or polypropylene, and a high surface energy, i.e., polar, polymer such as a polyamide or polyester. The method comprises the step of admixing with the np-PO less than 50, and preferably less than 40, wt % of a polydiene-based polyurethane or a polydiol-based polyurethane, based on the combined weight of the np-PO and the polydiene-based polyurethane or polydiol-based polyurethane, prior to contacting the nonpolar polymer with the polar polymer.

As one example, the adhesion between a film layer comprising a nonpolar np-PO such as polyethylene or polypropylene, and an adjacent film layer comprising a polar polymer such as polyester or polyamide, is improved by admixing with the np-PO before it is cast or extruded as a film less than 50 wt % of a polydiene-based polyurethane or a polydiol-based polyurethane, and then casting or extruding the film layer and joining it to the polar film layer. As another example, the polar film layer is joined to the np-PO film layer by a tie layer comprising a blend that comprises the np-PO and less than 40 wt % of a polydiene-based polyurethane or a polydiol-based polyurethane based on the weight of the blend.

In another embodiment, the invention is a method for imparting at least one of paintability, printability, dyeability, high frequency (HF) weldability and over-moldability to an article comprising a low surface energy material. The article typically comprises a film or molded part, and the material typically comprises one or more np-POs, e.g., polyethylene, polypropylene and the like. As one example of this embodiment, the method comprises the step of admixing with the np-PO less than 50, and preferably less than 40, wt % of a polydiene-based polyurethane or a polydiol-based polyurethane, based on the combined weight of the np-PO and the polydiene-based polyurethane or polydiol-based polyurethane, prior to painting, printing, dyeing, HF-welding and over-molding the polar material with the np-PO, or vice versa. As another example of this embodiment, the nonpolar material in the form of a film or molded part is at least partially overlaid with a tie layer comprising a blend that comprises the np-PO and less than 50 wt % of a polydiene-based polyurethane or a polydiol-based polyurethane, based on the weight of the blend, prior to painting, printing, dyeing, HF-welding or over-molding with the polar material, or vice versa.

In another embodiment, the invention is an article comprising (i) one or more np-PO and less than 50, preferably less than 40, wt % of a polydiene-based polyurethane or a polydiol-based polyurethane, or (ii) a polydiene-based polyurethane or a polydiol-based polyurethane tie-layer joining high and low surface energy materials. The polydiol-based polyurethane is preferably a thermoplastic polybutadiene diol based polyurethane (pd-TPU).

In one embodiment, the polyurethane is a polydiene-based polyurethane. In a preferred embodiment, the polydiene-based polyurethane is a polydiene diol-based polyurethane. In a further embodiment, the polydiene diol-based polyurethane is a polybutadiene diol or polyisoprene diol or a combination thereof, and preferably a polybutadiene diol.

In another embodiment, the polyurethane is a polydiol-based polyurethane. In a further embodiment, the polydiol-based polyurethane is formed from at least one diol made from one or more seed oil triglycerides selected from the group consisting of palmitic, stearic, oleic, linoleic and linolenic acid or ester.

Examples of the polydiol-based polyurethanes include, but are not limited to, polyurethanes formed from polyester polyols and seed oil-based polyols.

In another embodiment, the invention is a footwear article comprising at least one component formed from a blend of an np-PO and a polydiene-based polyurethane or a polydiol-based polyurethane. In one embodiment, the article is selected from the group consisting of shoe outsole, shoe midsole, shoe unit-sole, an over-molded article, a natural leather article, a synthetic leather article, an upper, a laminated article, a coated article, a boot, a sandal, galoshes, a plastic shoe, and combinations thereof.

In one embodiment, the polyurethane is a polydiene-based polyurethane. In a preferred embodiment, the polydiene-based polyurethane is a polydiene diol-based polyurethane. In a further embodiment, the polydiene diol-based polyurethane is a polybutadiene diol or polyisoprene diol or a combination thereof, and preferably a polybutadiene diol.

In another embodiment, the polyurethane is a polydiol-based polyurethane. In a further embodiment, the polydiol-based polyurethane is formed from at least one diol made from one or more seed oil triglycerides selected from the group consisting of palmitic, stearic, oleic, linoleic and linolenic acid or ester.

Examples of the polydiol-based polyurethanes include, but are not limited to, polyurethanes formed from polyester polyols and seed oil-based polyols.

In another embodiment, the invention is an aqueous dispersion comprising water and a blend of one or more np-PO and one or more polydiene-based polyurethane or polydiol-based polyurethane. Typically the dispersion comprises between 30 and 50 wt % solids, i.e., the blend, and the solids have an average particle size between 0.4 microns and 2.5 microns as determined by light scattering. The dispersions are useful in a wide variety of applications including primers, paints, coatings and the preparation of films that enable adhesion between polar and nonpolar materials.

In one embodiment, the polyurethane is a polydiene-based polyurethane. In a preferred embodiment, the polydiene-based polyurethane is a polydiene diol-based polyurethane. In a further embodiment, the polydiene diol-based polyurethane is a polybutadiene diol or polyisoprene diol or a combination thereof, and preferably a polybutadiene diol.

In another embodiment, the polyurethane is a polydiol-based polyurethane. In a further embodiment, the polydiol-based polyurethane is formed from at least one diol made from one or more seed oil triglycerides selected from the group consisting of palmitic, stearic, oleic, linoleic and linolenic acid or ester.

Examples of the polydiol-based polyurethanes include, but are not limited to, polyurethanes formed from polyester polyols and seed oil-based polyols.

In one embodiment, the polydiene-based polyurethane and, preferably, a polydiene diol-based polyurethane, is formed from at least one aliphatic or cyclo-aliphatic diisocyanate. In a further embodiment, both the polydiene-based polyurethane, and preferably a polydiene diol-based polyurethane, and the thermoplastic polyurethane are each, independently, formed from at least one aliphatic diisocyanate.

In another embodiment, the polydiol-based polyurethane is formed from at least one aliphatic or cyclo-aliphatic diisocyanate. In a further embodiment, both the poly diol-based polyurethane and the thermoplastic polyurethane are each, independently, formed from at least one aliphatic diisocyanate. In yet a further embodiment, the polydiol-based polyurethane comprises at least one diol made from one or more seed oil triglycerides selected from the group consisting of palmitic, stearic, oleic, linoleic and linolenic acid or ester.

In another embodiment, the invention is a method for imparting HF-weldability to an article comprising a nonpolar material, the method comprising the step of admixing with the nonpolar material less than 50 wt % of a polydiene-based polyurethane or a polydiol-based polyurethane, based on the combined weight of the nonpolar material and the polydiene-based polyurethane or polydiol-based polyurethane.

The compositions comprising a nonpolar material, particularly a np-PO and a polydiene-based polyurethane or a polydiol-based polyurethane used in the practice of this invention can be employed in a wide variety of applications including, but not limited to, tie layers between extruded sheets or films or profiles, fiber, aqueous dispersions, automotive products (e.g., skins, airbags, head rests, arm rests, headliners, carpet underlayment, etc.), awnings, tarps, roofing construction (e.g., adhesives to epoxy, urethane or acrylic-based substrates for all roofing applications such as insulation bonding, liquid roofing, façade sealant, expansion joints, wet-room sealants, pitched roof, acrylics-adhered roof, bitumen bonding and PUR-adhered refurbishment), paintable automobile skins and steering wheels, paintable injection molded toys, powder coatings, powder slush moldings or rotational cast moldings (typically, each with a particle size of less than 950 micron), consumer durables, grips, handles, computer components (e.g., key pads), belts, adhesive for fabric/polyurethane (PU) foam laminates (e.g., appliqués and footwear), adhesives (hot melt or otherwise), e.g., for binding an abrasion layer to an extruded article, conveyor and timing belts, fabric, carpet, artificial turf, coatings, wire and cable, and raincoats and similar protective apparel.

The inventive compositions are particularly suited for use as primers, paints and coatings. Primer applications include, but are not limited to, primers for wall paper, wall bases, footwear components, automotive skins, automotive hoses and other automotive components. The inventive compositions may be used as primers to promote the adhesion of polyolefin substrates to polar glues and coatings, such as conventional polyurethane glues and coatings. The inventive compositions may be used as primers for PET braids, and cords used in automotive belts, to promote polyolefin adhesion to these substrates. The inventive compositions may also be used as adhesives or cast films for footwear or automotive applications, and as barrier layers or barrier films between olefinic and polar substrates, such as a barrier layer between a soft TPO skin and polyurethane foam, glue or coating.

BRIEF DESCRIPTION OF THE DRAWINGS

FIG. 1 is a classification chart for a cross-hatch paint adhesion chart.

DESCRIPTION OF THE PREFERRED EMBODIMENTS

Definitions

Figure 2:
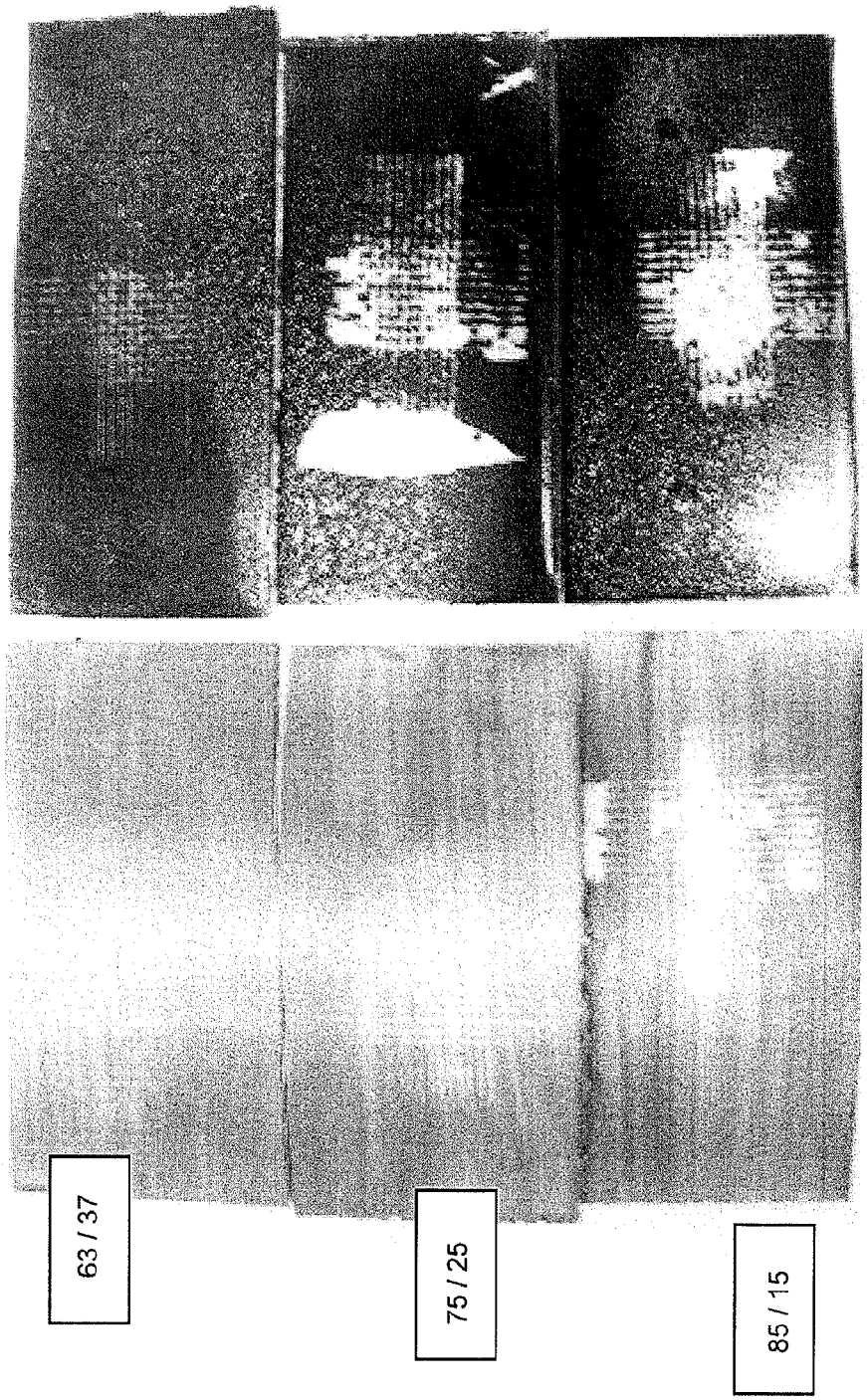
FIG. 2 is a collection of painted injection molded plaques that have been subjected to a cross-hatch paint adhesion test.

The numerical ranges in this disclosure include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, melt index, molecular weight distribution (Mw/Mn), percent crystallinity, percent comonomer, and the number of carbon atoms in the comonomer.

"Composition" and like terms mean a mixture of two or more materials. Included in compositions are pre-reaction, reaction and post-reaction mixtures the latter of which will include reaction products and by-products as well as unreacted components of the reaction mixture and decomposition products, if any, formed from the one or more components of the pre-reaction or reaction mixture.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate can comprise a blend.

"Polymer" means a polymeric compound prepared by polymerizing monomers, whether of the same or a different type. The generic term polymer thus embraces the term homopolymer, usually employed to refer to polymers prepared from only one type of monomer, and the term interpolymer as defined below.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Olefin-based polymer", "polyolefin", "PO" and like terms means a polymer that comprises more than 50 mole percent units derived from polymerized olefin monomer, for example ethylene or propylene (based on the total amount of polymerizable monomers). Representative polyolefins include polyethylene, polypropylene, polybutene, polyisoprene and their various interpolymers. In the context of this disclosure, "olefin-based polymer" and like terms explicitly exclude olefin multi-block interpolymers.

"Olefin multi-block interpolymer", "multi-block interpolymer", "multi-block copolymer", "segmented copolymer" and like terms refer to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block copolymers of the prior art, including copolymers produced by sequential monomer addition, fluxional catalysts, or anionic polymerization techniques, the multi-block copolymers used in the practice of this invention are characterized by unique distributions of both polymer polydispersity (PDI or Mw/Mn or MWD), block length distribution, and/or block number distribution, due, in a preferred embodiment, to the effect of the shuttling agent(s) in combination with multiple catalysts used in their preparation. More specifically, when produced in a continuous process, the polymers desirably possess PDI from 1.7 to 3.5, preferably from 1.8 to 3, more preferably from 1.8 to 2.5, and most preferably from 1.8 to 2.2. When produced in a batch or semi-batch process, the polymers desirably possess PDI from 1.0 to 3.5, preferably from 1.3 to 3, more preferably from 1.4 to 2.5, and most preferably from 1.4 to 2. In the context of t h is disclosure, "olefin multi-block interpolymer" and like terms explicitly exclude olefin-based polymers. Representative olefin multi-block interpolymers include the olefin multi-block interpolymers manufactured and sold by The Dow Chemical Company under the trademark INFUSE™.

"Ethylene multi-block copolymer" and like terms means a multi-block copolymer comprising units derived from ethylene and one or more copolymerizable comonomers, in which the ethylene-derived units comprise a plurality of the polymerized monomer units of at least one block or segment in the polymer, preferably at least 90, more preferably at least 95 and most preferably at least 98, mole percent of the block. Based on total polymer weight, the ethylene multi-block copolymers used in the practice of the present invention preferably have an ethylene content from 25 to 97, more preferably from 40 to 96, even more preferably from 55 to 95 and most preferably from 65 to 85, percent.

"Ethylene-based polymer" and like terms means an olefin-based polymer that comprises more than 50 mole percent polymerized ethylene monomer (based on the total amount of polymerizable monomers). As used in the context of this disclosure, ethylene-based polymer and like terms explicitly excludes ethylene multi-block interpolymers.

"Ethylene/α-olefin interpolymer" and like terms means an olefin-based interpolymer that comprises more than 50 mole percent polymerized ethylene monomer (based on the total amount of polymerizable monomers), and at least one α-olefin. As used in the context of this disclosure, ethylene/α-olefin interpolymer and like terms explicitly excludes ethylene/α-olefin multi-block interpolymers.

"Random ethylene/α-olefin interpolymer" and like terms are used in this disclosure consistent with their use in the art in reference to polymers, and they refer to ethylene-based interpolymers in which the comonomer(s) is/are randomly distributed along the polymer chain. As used in the context of this disclosure, random ethylene/α-olefin interpolymer and like terms explicitly excludes ethylene/α-olefin multi-block interpolymers.

"Propylene-based polymer" and like terms means an olefin-based polymer that comprises more than 50 mole percent polymerized propylene monomer (based on the total amount of polymerizable monomers). As used in the context of this disclosure, propylene-based polymer and like terms explicitly excludes propylene multi-block interpolymers.

"Propylene/α-olefin interpolymer" and like terms means an interpolymer that comprises more than 50 mole percent polymerized propylene monomer (based on the total amount of polymerizable monomers), and at least one α-olefin. As used in the context of this disclosure, propylene/α-olefin interpolymer and like terms explicitly excludes propylene/α-olefin multi-block interpolymers.

The term, "propylene/ethylene interpolymer" and like terms means an interpolymer that comprises more than 50 mole percent polymerized propylene monomer (based on the total amount of polymerizable monomers) with the remainder of the interpolymer comprising at least some, e.g., typically at least 1 mole percent, polymerized ethylene monomer. This term, as used herein, does not refer to a propylene/ethylene multi-block interpolymer.

"Polydiene-based polyurethane" and like terms mean a polyurethane polymer formed, in part, from a polydiene containing at least one isocyanate-reactive group, e.g., hydroxyl and/or amine.

"Polydiol-based polyurethane" and like terms mean a polyurethane polymer formed, in part, from a polydiol containing at least two hydroxyl groups.

"Polydiene diol-based polyurethane" and like terms mean a polyurethane polymer formed, in part, from a polydiene containing at least two hydroxyl groups.

"Natural-sourced diol", "natural oil polyols" and like terms mean a diol derived from an agricultural product, e.g., seed oils such soy, sunflower, corn and canola. Such a diol may or may not contain dienic unsaturation. The composition of seed oil triglycerides is well understood. Triglycerides are fatty acid esters of glycerin, and the composition depends on the source of the oil. The nomenclature used is standard in the fats and oils industry, with the number of carbons in the fatty acid indicated first, followed by the number of sites of unsaturation in parentheses. Representative oils include palmitic, stearic, oleic, linoleic and linolenic. For the purpose of making polyols from these triglycerides, oils which contain a high level of unsaturation are desirable. Oils such as soy, canola and sunflower are acceptable due to the relatively low levels of saturated fatty acids that they contain, while feedstocks such as palm oil are considered unusable without further purification or refinement due to high levels of saturated fatty acids.

"Laminates", "laminations" and like terms mean two or more layers, e.g., film layers, in intimate contact with one another. Laminates include molded articles bearing a coating. Laminates are not blends, although one or more layers of a laminate may comprise a blend.

"Polar", "polar polymer", and like terms mean that the molecules of the polymer have a permanent dipole, i.e., the polymer molecule has a positive end and a negative end. In other words, the electrons in a polar molecule are not shared equally among the atoms of the molecule. In contrast, "nonpolar", "nonpolar polymer" and like terms mean that the polymer molecules do not have a permanent dipole, i.e., the polymer does not have a positive end and a negative end. The electrons in a nonpolar molecule are essentially equally shared among the atoms of the molecule. Most hydrocarbon liquids and polymers are nonpolar. Polymers substituted with carboxyl, hydroxyl and the like are often polar polymers. Articles prepared from nonpolar polymers have relatively low surface energy, i.e., less than 32 dyne per centimeter (dyne/cm), and articles prepared from polar polymers have relatively high surface energy, i.e., 32 or more dyne/cm. The nonpolar material of this invention typically comprises one or more nonpolar thermoplastic olefinic polymers, typically elastomers, free of any significant amount of polar functionality, e.g., hydroxyl, carboxyl, carbonyl, ester, ether, amide, mercaptan, halide and the like groups. The polar material of this invention typically comprises one or more polymers comprising one or more polar functionalities. Typical polymers comprising one more polar functionalities include polyesters, polyethers, polylactic acid, polycarbonates, nylons, polysulfides, polysulfones, polyurethanes, polyvinyl alcohol, poly(vinyl acetate), poly(vinyl chloride), acrylonitrile and ABS. Polar materials, polar substrates, polar films, etc. are typically formed from polar polymers as described in this paragraph. Nonpolar materials, nonpolar substrates, nonpolar films, etc. are typically formed from nonpolar polymers as described in this paragraph.

"Insignificant amount of polar functionality" and like terms mean that a polymer does not comprise a sufficient number of polar functional groups to impart a surface energy of at least 32 dyne/cm to an article made from it.

"Substantially free" and like terms means that the composition contains only insignificant amounts of a compound such that any presence of the compound does not have any material effect on the composition. Typically, a composition is considered substantially free of a compound when that compound is present in less than 0.1 wt % based on the weight of the composition.

"Over-molding" and like terms mean a process in which one resin is injected into a mold containing a pre-placed substrate, and molded over this substrate. Over-molding is typically used to improve the performance and properties of a final product by over-molding one resin over another polymer substrate. Over-molding can be used to form seamless, integrated parts. Examples of over-molded parts include flexible grip handles on power tools and kitchen utensils that provide additional gripping properties without the hygienic concern normally associate with mechanical assemblies. The substrate may be any suitable material such as a plastic, metal or ceramic part.

"Molded overlay" and like terms mean an article comprising at least two parts (an injection molded part and a substrate) that are bound together. The injection molded part is paced on top of the substrate, outside the injection mold. An adhesive may be used to bind the injection molded part to the substrate. The substrate may be any suitable material such as a plastic, metal or ceramic part.

Compositions Useful in the Practice of the Invention:

In one embodiment of this invention, the blends comprise at least one np-PO, preferably an ethylene/α-olefin random interpolymer and at least one polydiene-based polyurethane or polydiol-based polyurethane. In another embodiment, the np-PO is present in an amount greater than, or equal to, 50 wt %, and the polydiene-based polyurethane or polydiol-based polyurethane is present in an amount less than, or equal to, 50 wt %, both percentages based on the combined weight of the np-PO and the polydiene-based polyurethane or polydiol-based polyurethane. The amounts are preferably from 50 to 90 wt % np-PO, and from 50 to 10 wt % polydiene-based polyurethane or polydiol-based polyurethane, and more preferably from 50 to 85 wt % np-PO, and from 50 to 15 wt % polydiene-based polyurethane or polydiol-based polyurethane. In another embodiment, the blend comprises 55 to 80 wt % of the np-PO, and 45 to 20 wt % of the polydiene-based polyurethane or polydiol-based polyurethane. The polydiene-based polyurethane or polydiol-based polyurethane can comprise one or both of a polydiene-based polyurethane or a polydiol-based polyurethane and a natural sourced diol. The amounts are chosen to total 100 wt %.

In one embodiment, the polyurethane is a polydiene-based polyurethane. In a preferred embodiment, the polydiene-based polyurethane is a polydiene diol-based polyurethane. In a further embodiment, the polydiene diol-based polyurethane is a polybutadiene diol or polyisoprene diol or a combination thereof, and preferably a polybutadiene diol.

In another embodiment, the polyurethane is a polydiol-based polyurethane. In a further embodiment, the polydiol-based polyurethane is formed from at least one diol made from one or more seed-oil triglycerides selected from the group consisting of palmitic, stearic, oleic, linoleic and linolenic acid or ester.

Examples of the polydiol-based polyurethanes include, but are not limited to, polyurethanes formed from polyester polyols and seed oil-based polyols.

In one embodiment, the polydiene-based polyurethane and, preferably, a polydiene diol-based polyurethane, is formed from at least one aliphatic or cyclo-aliphatic diisocyanate.

In another embodiment, the polydiol-based polyurethane is formed from at least one aliphatic or cyclo-aliphatic diisocyanate. In yet a further embodiment, the polydiol-based polyurethane comprises at least one diol made from one or more seed oil triglycerides selected from the group consisting of palmitic, stearic, oleic, linoleic and linolenic acid or ester Preferred blends used in the practice of this invention comprise 50 wt % or more, and preferably 60 wt % or more of a np-PO, and 50 wt % or less and preferably 40 wt % or less of a polydiene-based polyurethane or a polydiol-based polyurethane. In one embodiment, the blend comprises from 50 wt % to 80 wt %, and preferably from 55 wt % to 77 wt %, of the np-PO; and 20 wt % to 50 wt %, and preferably from 23 to 45 wt % of the polydiene-based polyurethane or polydiol-based polyurethane; both percentages are based on the combined weight of the np-PO and the polydiene-based polyurethane or polydiol-based polyurethane.

In one embodiment, the polyurethane is a polydiene-based polyurethane. In a preferred embodiment, the polydiene-based polyurethane is a polydiene diol-based polyurethane. In a further embodiment, the polydiene diol-based polyurethane is a polybutadiene diol or polyisoprene diol or a combination thereof, and preferably a polybutadiene diol.

In another embodiment, the polyurethane is a polydiol-based polyurethane. In a further embodiment, the polydiol-based polyurethane is formed from at least one diol made from one or more seed oil triglycerides selected from the group consisting of palmitic, stearic, oleic, linoleic and linolenic acid or ester.

Examples of the polydiol-based polyurethanes include, but are not limited to, polyurethanes formed from polyester polyols and seed oil-based polyols.

In one embodiment, the polydiene-based polyurethane and, preferably, a polydiene diol-based polyurethane, is formed from at least one aliphatic or cyclo-aliphatic diisocyanate.

In another embodiment, the polydiol-based polyurethane is formed from at least one aliphatic or cyclo-aliphatic diisocyanate. In yet a further embodiment, the polydiol-based polyurethane comprises at least one diol made from one or more seed oil triglycerides selected from the group consisting of palmitic, stearic, oleic, linoleic and linolenic acid or ester If the blends used in the practice of this invention comprise components other than np-PO and polydiene-based polyurethane or polydiol-based polyurethane, e.g., filler, pigment, etc., than the combination of np-PO and d-TPU comprises greater than 85, preferably greater than 90 and more preferably greater than 95, wt % based on the total weight of the blend.

In one embodiment, the blends used in the practice of the invention have a melt index ($I_2$) from 0.01 to 100, preferably from 0.1 to 50, and more preferably from 1 to 40 and even more preferably from 5 to 40, g/10 min as determined using ASTM D-1238 (190° C., 2.16 kg load). In another embodiment, the blend has an $I_2$ greater than, or equal to, 0.01, preferably greater than, or equal to 1 and more preferably greater than, or equal to 5, g/10 min. In another embodiment the blend has an $I_2$ less than, or equal to 100, preferably less than or equal to 50 and more preferably less than or equal to 20, g/10 min. The $I_2$ of the blend as described above is measured on a neat blend, i.e., a blend without other components that may significantly affect the measurement of the $I_2$.

In another embodiment, the blends have a percent crystallinity of less than or equal to 50, preferably less than or equal to 30 and more preferably less than or equal to 20, percent as measured by DSC. Preferably, these polymers have a percent crystallinity from 2 to 50%, including all individual values and subranges from 2 to 50%. The crystallinity of the blend as described above is measured on a neat blend, i.e., a blend without other components that may significantly affect the measurement of the crystallinity.

In another embodiment, the blends have a density greater than or equal to 0.855, preferably greater than or equal to 0.86 and more greater than or equal to 0.87, grams per cubic centimeter ($g/cm^3$ or g/cc) and a density less than or equal to 1, preferably less than or equal to 0.97, more preferably less than or equal to 0.96 and even more preferably less than or equal to 0.95, $g/cm^3$. In one embodiment, the density is from 0.855 to 0.97, preferably from 0.86 to 0.95 and more preferably from 0.865 to 0.93, $g/cm^3$. The density of the blend as described above is measured on a neat blend, i.e., a blend without other components that may significantly affect the measurement of the density. In those embodiments in which the blend comprises one or more filler, e.g., barium sulfate, talc, etc., the maximum density can exceed 1 $g/cm^3$, e.g., the maximum density can approach or exceed 1.4 $g/cm^3$ depending upon, among other things, the nature and amount of filler.

In another embodiment, the blends, neat and in fabricated form, have a tensile strength from 5 to 40, preferably from 8 to 30 and even more preferably from 9 to 20, MegaPascal (MPa).

In another embodiment, the blends, neat and in fabricated form, have an elongation in the machine direction or the cross machine direction from 50 to 600, or from 50 to 500, as measured according to ASTM D-638-03.

In another embodiment, the blends in neat form have a melt strength from 0.5 to 50, and more preferably from 0.5 to 20 and even more preferably from 0.5 to 10, centiNewton (cN).

In another embodiment, the blends in neat form have a surface tension from 10 to 100, and more preferably from 20 to 70 and even more preferably from 30 to 50, dyne per centimeter at room temperature or 23 C (dyn/cm).

In another embodiment, the blends in neat form have a surface tension greater than or equal to 30, more preferably greater than or equal to 35, and even more preferably greater than or equal to 40, dyn/cm at room temperature or 23 C.

In one embodiment, the invention provides for the use of such blends, as discussed above, and in which the ethylene/α-olefin random copolymer is present as a continuous or co-continuous phase with the polydiene-based polyurethane or polydiol-based polyurethane.

In another embodiment, the invention provides for the use of such blends, as discussed above, and in which the ethylene/α-olefin random copolymer is present as a discreet phase within the polydiene-based polyurethane or polydiol-based polyurethane.

The blends used in the practice of the invention may be prepared by combining one or more np-POs, such as an ethylene/α-olefin random interpolymer, with one or more polydiene-based polyurethane or polydiol-based polyurethane. Typically, the inventive blends are prepared by post-reactor blending the polymer components (the random ethylene/α-olefin random interpolymer and the polydiene-based polyurethane or polydiol-based polyurethane). Illustrative of a post-reactor blending is an extrusion in which two or more solid polymers are fed into an extruder, and physically mixed into a substantially homogeneous composition. The blends used in the practice of this invention may be crosslinked and/or foamed. In a preferred embodiment, the blends are prepared by mixing the ethylene/α-olefin random interpolymer and the polydiene-based polyurethane or polydiol-based polyurethane in a melt process. In a further embodiment, the melt process is a melt extrusion process.

In one embodiment, the polyurethane is a polydiene-based polyurethane. In a preferred embodiment, the polydiene-based polyurethane is a polydiene diol-based polyurethane. In a further embodiment, the polydiene diol-based polyurethane is a polybutadiene diol or polyisoprene diol or a combination thereof, and preferably a polybutadiene diol.

In another embodiment, the polyurethane is a polydiol-based polyurethane. In a further embodiment, the polydiol-based polyurethane formed from at least one diol made from one or more seed oil triglycerides selected from the group consisting of palmitic, stearic, oleic, linoleic and linolenic acid or ester.

Examples of the polydiol-based polyurethanes include, but are not limited to, polyurethanes formed from polyester polyols and seed oil-based polyols.

In one embodiment, the polydiene-based polyurethane and, preferably, a polydiene diol-based polyurethane, is formed from at least one aliphatic or cyclo-aliphatic diisocyanate.

In another embodiment, the polydiol-based polyurethane is formed from at least one aliphatic or cyclo-aliphatic diisocyanate. In yet a further embodiment, the polydiol-based polyurethane comprises at least one diol made from one or more seed oil triglycerides selected from the group consisting of palmitic, stearic, oleic, linoleic and linolenic acid or ester.

The blends of this invention can also be formulated as a water-based or aqueous dispersion. In this embodiment, the blends are admixed with water in any convenient manner, e.g., mixing in a blender or an extruder, usually adding water to the blend as opposed to adding the blend to the water. The blend can be formed under a wide variety of conditions, e.g., ambient, elevated temperatures, sub- and super-atmospheric pressure, etc., and the amount of solids (i.e., blend) in the water can also vary widely. Typically the amount of solids in the dispersion is from greater than zero, preferably at least 20 and more preferably at least 30, wt % based on the weight of the dispersion. The maximum solids loading will vary with the nature of the blend and conditions of the dispersion, e.g., temperature, pressure, presence or absence of dispersing agents, etc., but the typically maximum is about 70, preferably about 60 and more preferably 55, wt % based on the total weight of the dispersion.

The dispersion can contain other components in addition to the blend and water, e.g., surfactants, wetting agents, pigments, antioxidants, fillers, processing aids, and the like. These additional components are optional, and are used in known manners and in known amounts. The surfactants (also known as dispersing agents) are used to achieve dispersion of the solids throughout the water matrix, and they can be of any various types including but not limited to anionic, nonionic and, preferably, water-soluble. Wetting agents are used to assist the dispersion to flow evenly and completely across the surface of a substrate, and these include but are not limited to such materials as DOWFAX 2A1 (an anionic compound) and TERGITOL 15-S-9 (a nonionic compound).

The preparation of aqueous dispersions is described in, among other generally available references, U.S. Patent Application Publication 2005/0100754.

In one embodiment, the dispersions of this invention form a film on certain olefinic substrates upon drying at room temperature. In this embodiment, the more elastomeric the blend, substrate or both (i.e., the lower the crystallinity), the more apt the blend is to form a film at room temperature on the olefinic substrate. In this capacity, the dispersion can serve as a primer for olefinic footwear, wallpaper, wall base, automotive skins, automotive hoses (e.g., the hose is passed through a dip tank and primed, dried and another polar material is extruded over it), and in virtually any other application in which adhesion of a polyolefin elastomer to a polyurethane glue, foam, coating, etc., is desired. These dispersions can also be used as primers for polyethylene terephthalate (PET) braids, cords used in automotive belts, and the like.

In addition to the nonpolar polyolefins and diol-based polyurethane, the blends used in the practice of the invention may further contain at least one additive, including, but not limited to, antioxidants, surface tension modifiers, blowing agents, foaming agents, antistatic agents, release agents, process oil, filler, wax, pigments, crosslinking agents and antiblock agents. An example of a hindered phenolic antioxidant is Irganox® 1076 antioxidant available from Ciba-Geigy Corp.

In another embodiment, the blends comprise a polypropylene polymer component either as the np-PO or in combination with one or more other np-POs such as an ethylene/α-olefin random interpolymer.

In one embodiment, the blend is co-extruded with another polyolefin to from a film comprising at least two layers or plies. In another embodiment, the composition is co-extruded with one or more polyolefins to form a film comprising at least three layers or plies. In this embodiment, the layer comprising the blend is the intermediate layer, and it acts as a tie layer between the two external layers. Suitable polyolefins for co-extrusion include high melt strength ($\geqq 5$ cN) ethylene/α-olefin interpolymers, and rheology-modified, substantially gel-free thermoplastic elastomer compositions, as described in U.S. Pat. No. 6,506,842.

The blends that can be used in the practice of this invention as described above can also be admixed with one or more other types of thermoplastic polyurethanes, such as polyether/polyol-based urethanes and/or polyester/polyol-based urethanes. In such blends each polyurethane component may or may not contain one or more unsaturated groups. Also, such blends may also contain one or more additional polyolefins and/or one or more polyolefin elastomers.

Suitable polyether polyols include, but are not limited to, those obtained by the alkoxylation of suitable starting molecules with an alkylene oxide, such as ethylene oxide, propylene oxide, butylene oxide or mixtures of two or more of these materials.

In one embodiment, the compositions of this invention further comprise a styrenic block copolymer. These styrenic block copolymer may be a triblock copolymer including but not limited to styrene-butadiene-styrene triblock copolymers (SBS) and hydrogenated SBS copolymers, styrene-butadiene diblock copolymers and hydrogenated styrene-butadiene diblock copolymers, styrene-isoprene-styrene triblock copolymers (SIS) and hydrogenated SIS copolymers, styrene-isoprene diblock copolymers and hydrogenated styrene-isoprene diblock copolymers, styrene-ethylene-butylene-styrene (SEBS) tetrablock copolymers and hydrogenated SEBS copolymers, styrene-acrylonitrile copolymers (SAN), and elastomer-modified SAN. The styrenic polymer may be a hydrogenated styrene-butadiene-styrene triblock copolymer, available from Shell Chemical under the trade name KRATON G-1652.

In one embodiment, the compositions of this invention further comprise a crosslinking agent. If crosslinking is desired, then it can be effected by the use of any one of a number of different agents, e.g., by the use of thermally activated initiators, e.g., peroxides and azo compounds; photoinitiators, e.g., benzophenone; a vinyl silane, e.g., vinyl tri-ethoxy or vinyl tri-methoxy silane; and the like. Alternatively, crosslinking can be obtained by substituting a crosslinking technique for a crosslinking agent, e.g., the use of radiation techniques other than sunlight and UV light, e.g., E-beam and x-ray, and moisture cure although both of these techniques can benefit from the use of an initiator. These crosslinking agents and techniques are used in known amounts and using known equipment and procedures.

In one embodiment, the inventive composition further comprises a styrenic block copolymer. In a further embodiment, the styrenic block copolymer is styrene-butadiene-styrene block or hydrogenated styrene-butadiene-styrene block copolymer.

In one embodiment, the composition further comprises at least one crosslinking agent. In a further embodiment, the crosslinking agent is at least one of peroxide, an azo compound, a photoinitiator and a vinyl silane. In another embodiment, the composition is subjected to e-beam or x-ray radiation or moisture crosslinking conditions.

In another embodiment, the invention is an article comprising at least one component made from the above-described component. In a further embodiment, the article is selected from the group consisting of a film, sheet, fiber, tube, fabric, foam, adhesive, coating, sheath for wire or cable, protective apparel, automotive part, footwear component, laminate, powder coating, powder slush molding, or consumer durable.

Suitable polyester/polyols include, but are not limited to, poly(alkylene alkanedioate) glycols, prepared via a conventional esterification process using a molar excess of an aliphatic glycol, relative to an alkanedioic acid. Suitable isocyanates, and, if needed, chain extenders, and chain stoppers, can also be employed as desired.

The blends useful in the practice of this invention may comprise a combination of two or more embodiments as described above.

Ethylene/α-Olefin Random Interpolymer as an np-PO Component:

In one embodiment, the blends used in the practice of the invention comprise at least one ethylene/α-olefin (EAO) random interpolymer. An ethylene/α-olefin interpolymer is a polymer prepared by polymerizing ethylene with at least one comonomer, typically an α-olefin of 3 to 20 carbon atoms ($C_3$-$C_{20}$), or a diene, such as 1,4-butadiene or 1,4-hexadiene.

Illustrative α-olefins include propylene, 1-butene, 1-pentene, 1-hexene, 4-methyl-1-pentene, 1-heptene, 1-octene, 1-nonene, 1-decene, and styrene. The α-olefin is desirably a $C_3$-$C_{10}$ α-olefin. Preferably, the α-olefin is propylene, 1-butene, 1-hexene or 1-octene. Illustrative interpolymers include ethylene/propylene (EP) copolymers, ethylene/butene (EB) copolymers, ethylene/hexene (EH) copolymers, ethylene/octene (EO) copolymers, ethylene/α-olefin/diene modified (EAODM) interpolymers, such as ethylene/propylene/diene modified (EPDM) interpolymers and ethylene/propylene/octene terpolymers. Preferred copolymers include EP, EB, EH and EO polymers.

In another embodiment, the ethylene/α-olefin interpolymers have comonomer(s) incorporation into the final polymer at greater than 5 wt %, preferably greater than 10 wt %, based on the total weight of polymerizable monomers. The amount of comonomer(s) incorporation can be greater than 15 wt %, and can even be greater than 40 or 45 wt %, based on the total weight of polymerizable monomers.

Preferably, the EAO interpolymers used in the practice of this invention have a molecular weight distribution (Mw/Mn or MWD or PDI) of 1.5 to 4.5, more preferably 1.8 to 3.8 and most preferably 2.0 to 3.4. The EAO interpolymers have a density less than or equal to 0.93, preferably less than or equal to 0.92 and more preferably less than or equal to 0.91, g/cc. In another embodiment, the EAO interpolymers have a density greater than or equal to 0.86, preferably greater than or equal to 0.87 and more preferably greater than or equal to 0.88, g/cc. In another embodiment, the EAO interpolymers have a density from 0.86 to 0.93 g/cc.

In one embodiment, the EAO interpolymers have an I2 greater than or equal to 0.1, preferably greater than or equal to 0.5 and more preferably greater than or equal to 1.0, g/10 min. In another embodiment, the EAO interpolymers have an I2 less than or equal to 50, preferably less than or equal to 30 and more preferably less than or equal to 25, g/10 min. In another embodiment, the EAO interpolymers have an I2 from 0.1 to 50, preferably from 0.1 to 30 and more preferably from 0.1 to 25, g/10 min.

More specific examples of EAO interpolymers useful in this invention include very low density polyethylene (VLDPE) (e.g., FLEXOMER™ ethylene/1-hexene polyethylene made by The Dow Chemical Company), homogeneously branched, linear ethylene/α-olefin copolymers (e.g. TAFMER™ by Mitsui Petrochemicals Company Limited and EXACT™ by Exxon Chemical Company), and homogeneously branched, substantially linear ethylene/α-olefin polymers (e.g., AFFINITY™ and ENGAGE™ polyethylene available from The Dow Chemical Company). The more preferred polyolefin copolymers are the homogeneously branched linear and substantially linear ethylene copolymers. The substantially linear ethylene copolymers are especially preferred, and are more fully described in U.S. Pat. Nos. 5,272,236, 5,278,272 and 5,986,028. Other examples of suitable commercial EAO interpolymers include NORDEL™ MG and NORDEL™ IP products, available from The Dow Chemical Company, and VISTALON™, available from ExxonMobil Chemical Company.

In another embodiment of the invention, the EAO interpolymers have a 0.1 rad/sec shear viscosity (also referred to herein as low shear viscosity) greater than 100,000, preferably greater than 200,000, more preferably greater than 300,000 and most preferably greater than 400,000, poise. This viscosity is obtained by measuring the polymer viscosity at a shear rate of 0.1 rad/sec at 190 C, under a nitrogen atmosphere, using a dynamic mechanical spectrometer, such as an RMS-800 or ARES from Rheometrics.

Low shear viscosity is affected by the molecular weight (MW) and the degree of LCB of the polymer. The molecular weight is indirectly measured by the melt strength of the polymer. As a general rule, the greater the molecular weight of a polymer, the better the melt strength. However, when molecular weight becomes too great, the polymers become impossible to process. Incorporation of LCB into a polymer backbone improves the processability of high MW polymers. Thus, low shear viscosity (0.1 rad/sec) is somewhat of a measure of the balance of MW and LCB in a polymer.

In another embodiment of the invention, the ethylene/α-olefin random interpolymers have a melt strength (MS) of 5 cN or greater, preferably 6 cN or greater, and more preferably 7 cN or greater. Melt strength as here used is a maximum tensile force in cN measured on a molten filament of a polymer melt, extruded from a capillary rheometer die at a constant shear rate of 33 reciprocal seconds ($sec^{-1}$), while the filament is being stretched by a pair of nip rollers that are accelerating the filament at a rate of 0.24 centimeters per second (cm/sec), from an initial speed of 1 cm/sec. The molten filament is preferably generated by heating 10 grams (g) of a polymer that is packed into a barrel of an Instron capillary rheometer, equilibrating the polymer at 190 C for five minutes (min), and then extruding the polymer at a piston speed of 2.54 cm/min, through a capillary die with a diameter of 0.21 cm and a length of 4.19 cm. The tensile force is preferably measured with a Goettfert Rheotens melt tensile tester that is located so that the nip rollers are 10 cm directly below a point at which the filament exits the capillary die.

In one embodiment, the ethylene/α-olefin polymer (or interpolymer) is a linear ethylene-based interpolymer. The interpolymer can be either heterogeneously branched linear or homogeneously branched linear (as opposed to homogeneously branched substantially linear). The term "linear ethylene-based interpolymer," means an interpolymer that lacks long-chain branching or lacks measurable amounts of long chain branching, as determined by techniques known in the art, such as NMR spectroscopy.

The terms "homogeneous" and "homogeneously-branched" are used in reference to an ethylene/α-olefin polymer (or interpolymer), in which the α-olefin comonomer is randomly distributed within a given polymer molecule, and substantially all of the polymer molecules have the same ethylene-to-comonomer ratio. These interpolymers are typically prepared using a metallocene catalyst system.

The homogeneously branched linear ethylene interpolymers are ethylene interpolymers, which lack long chain branching (or measurable amounts of long chain branching), but do have short chain branches, derived from the comonomer polymerized into the interpolymer, and in which the comonomer is homogeneously distributed, both within the same polymer chain, and between different polymer chains. Homogeneously branched linear ethylene interpolymers lack long chain branching, just as is the case for the linear low density polyethylene polymers or linear high density polyethylene polymers, made using uniform branching distribution polymerization processes as described, for example, by Elston in U.S. Pat. No. 3,645,992.

Commercial examples of homogeneously branched linear ethylene/α-olefin interpolymers include TAFMER™ polymers supplied by the Mitsui Chemical Company and EXACT™ polymers supplied by ExxonMobil Chemical Company.

Heterogeneously branched linear ethylene-based interpolymers differ from the homogeneously branched ethylene-based interpolymers, primarily in their comonomer branching distribution. For example, heterogeneously branched interpolymers have a branching distribution, in which the polymer molecules do not have the same ethylene-to-comonomer ratio. Heterogeneously branched ethylene-based interpolymers are typically prepared with a Ziegler/Natta catalyst system. These linear interpolymers lack long chain branching (or measurable amounts of long chain branching).

Heterogeneously branched ethylene-based interpolymers include, but are not limited to, linear medium density polyethylene (LMDPE), linear low density polyethylene (LLDPE), very low density polyethylene (VLDPE), and ultra low density polyethylene (ULDPE). Commercial polymers include DOWLEX™ polymers, ATTANE™ polymer and FLEXOMER™ polymers (all from The Dow Chemical Company), and ESCORENE™ AND EXCEED polymers (both from Exxon Mobil).

In one embodiment, the ethylene/α-olefin polymer (or interpolymer) are substantially linear, homogeneously-branched, in which the α-olefin comonomer is randomly distributed within a given polymer molecule, and substantially all of the polymer molecules have the same ethylene-to-comonomer ratio. The substantially linear ethylene interpolymers used in the present invention are described in U.S. Pat. Nos. 5,272,236; 5,278,272; 6,054,544; 6,335,410 and 6,723,810. The substantially linear ethylene interpolymers are homogeneously branched ethylene polymers having long chain branching. The long chain branches have the same comonomer distribution as the polymer backbone, and can have about the same length as the length of the polymer backbone. The carbon length of a long chain branch is greater than the carbon length that results from the incorporation of one comonomer unit into the polymer backbone.

"Substantially linear," typically, is in reference to a polymer that is substituted, on average, with 0.01 long chain branches per 1000 total carbons (including both backbone and branch carbons) to 3 long chain branches per 1000 total carbons, as discussed above for the '272 patent. Some polymers may be substituted with 0.01 long chain branches per 1000 total carbons to 1 long chain branch per 1000 total carbons. Commercial examples of substantially linear polymers include the ENGAGE™ and AFFINITY™ polymers available from The Dow Chemical Company.

The substantially linear ethylene interpolymers form a unique class of homogeneously branched ethylene polymers. They differ substantially from the well-known class of conventional, homogeneously branched linear ethylene interpolymers, described by Elston in U.S. Pat. No. 3,645,992, and, moreover, they are not in the same class as conventional heterogeneous Ziegler-Natta catalyst polymerized linear ethylene polymers (for example, ultra low density polyethylene (ULDPE), linear low density polyethylene (LLDPE) or high density polyethylene (HDPE) made, for example, using the technique disclosed by Anderson et al. in U.S. Pat. No. 4,076, 698), nor are they in the same class as high pressure, free-radical initiated, highly branched polyethylene, such as, for example, low density polyethylene (LDPE), ethylene-acrylic acid (EAA) copolymers and ethylene vinyl acetate (EVA) copolymers.

The homogeneously branched, substantially linear ethylene interpolymers useful in the invention have excellent processability, even though they have a relatively narrow molecular weight distribution. Surprisingly, the melt flow ratio ($I_{10}/I_2$), according to ASTM D 1238, of the substantially linear ethylene interpolymers can be varied widely and essentially independently of the molecular weight distribution. This surprising behavior is completely contrary to conventional homogeneously branched linear ethylene interpolymers, such as those described, for example, by Elston in U.S. Pat. No. 3,645,992, and heterogeneously branched conventional Ziegler-Natta polymerized linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the $I_{10}/I_2$ value also increases.

The random ethylene/α-olefin component of the inventive compositions may contain a combination of two or more embodiments as described above.

Olefin Multi-Block Interpolymer as an np-PO Component:

Regarding the olefin multi-block interpolymers useful in the practice of this invention, these are described in the context of ethylene multi-block copolymers with the understanding that these copolymers are exemplary of the olefin multi-block interpolymers in general. Representative olefin multi-block interpolymers include the olefin multi-block interpolymers manufactured and sold by The Dow Chemical Company under the trademark INFUSE™.

The ethylene multi-block copolymers are made with two catalysts incorporating differing quantities of comonomer, and these copolymers have a weight ratio of blocks from 95:5 to 5:95. The elastomeric polymers desirably have an ethylene content of from 20 to 90 percent, optionally a diene content of from 0.1 to 10 percent, and an α-olefin content of from 10 to 80 percent, based on the total weight of the polymer. Further preferably, the multi-block elastomeric polymers of this embodiment have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000; a polydispersity less than 3.5, more preferably less than 3 and as low as about 2; and a Mooney viscosity (ML (1+4) 125 C.) from 1 to 250. More preferably, such polymers have an ethylene content from 65 to 75 percent, a diene content from 0 to 6 percent, and an α-olefin content from 20 to 35 percent.

The ethylene multi-block copolymers useful in the practice of this invention have a density of less than about 0.90, preferably less than about 0.89, more preferably less than about 0.885, even more preferably less than about 0.88 and even more preferably less than about 0.875, g/cc. The ethylene multi-block copolymers typically have a density greater than about 0.85, and more preferably greater than about 0.86, g/cc. Density is measured by the procedure of ASTM D-792. Low density ethylene multi-block copolymers are generally characterized as amorphous, flexible and having good optical properties, e.g., high transmission of visible and UV-light and low haze.

The ethylene multi-block copolymers useful in the practice of this invention typically have a melting point of less than about 125. The melting point is measured by the differential scanning calorimetry (DSC) method described in WO 2005/090427 (US2006/0199930). Ethylene multi-block copolymers with a low melting point often exhibit desirable flexibility and thermoplasticity properties useful in the fabrication of the modules of this invention.

The ethylene multi-block copolymers used in the practice of this invention, and their preparation and use, are more fully described in WO 2005/090427, US2006/0199931, US2006/0199930, US2006/0199914, US2006/0199912, US2006/0199911, US2006/0199910, US2006/0199908, US2006/0199907, US2006/0199906, US2006/0199905, US2006/0199897, US2006/0199896, US2006/0199887, US2006/0199884, US2006/0199872, US2006/0199744, US2006/0199030, US2006/0199006 and US2006/0199983.

In a further embodiment, the polymers of the invention, especially those made in a continuous, solution polymerization reactor, possess a most probable distribution of block lengths. The most preferred polymers used in the practice of this invention are multi-block copolymers containing 4 or more blocks or segments including terminal blocks. In one embodiment of this invention, the ethylene multi-block copolymers are defined as having:

(a) a Mw/Mn from about 1.7 to about 3.5, at least one melting point, Tm, in degrees Celsius, and a density, d, in grams/cubic centimeter, where in the numerical values of Tm and d correspond to the relationship $$Tm > -2002.9 + 4538.5(d) - 2422.2(d)^2, \text{ or}$$

(b) a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g}$$

$$\Delta T \geq 48 \text{ C for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30 C; or (c) an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ or}$$

(d) has a molecular weight fraction which elutes between 40 C and 130 C when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; or (e) has a storage modulus at 25 C, G'(25 C), and a storage modulus at 100 C, G'(100 C), wherein the ratio of G'(25 C) to G'(100 C) is in the range of about 1:1 to about 9:1.

The ethylene/α-olefin interpolymer may also have:

(a) a molecular fraction which elutes between 40 C and 130 C when fractionated using TREF, characterized in that the fraction has a block index of at least 0.5 and up to about 1 and a molecular weight distribution, Mw/Mn, greater than about 1.3; or (b) an average block index greater than zero and up to about 1.0 and a molecular weight distribution, Mw/Mn greater than about 1.3.

Polypropylene as an np-PO Component:

Suitable propylene-based polymers include propylene homopolymers, propylene interpolymers, as well as reactor copolymers of polypropylene (RCPP), which can contain about 1 to about 20 wt % ethylene or an α-olefin comonomer of 4 to 20 carbon atoms. The polypropylene homopolymer can be isotactic, syndiotactic or atactic polypropylene. The propylene interpolymer can be a random or block copolymer, or a propylene-based terpolymer. In another embodiment, the propylene-based polymers can be nucleated. "Nucleated" and similar terms refer to a polymer that has been modified by addition of a nucleating agent such as Millad®, a dibenzyl sorbitol commercially available from Milliken. Other conventional nucleating agents may also be used.

The propylene polymer may be crystalline, semi-crystalline or amorphous. A crystalline polypropylene polymer typically has at least 90 mole percent of its repeating units derived from propylene, preferably at least 97 percent, more preferably at least 99 percent.

Suitable comonomers for polymerizing with propylene include ethylene, 1-butene, 1-pentene, 1-hexene, 1-heptene, 1-octene, 1-nonene, 1-decene, 1-unidecene, 1-dodecene, as well as 4-methyl-1-pentene, 4-methyl-1-hexene, 5-methyl-1-hexene, vinylcyclohexane, and styrene. The preferred comonomers include ethylene, 1-butene, 1-hexene, and 1-octene, and more preferably ethylene. As here used, in reference to propylene-based polymers only, propylene/α-olefin interpolymer specifically includes propylene/ethylene interpolymer.

Optionally, the propylene-based polymer comprises monomers having at least two double bonds which are preferably dienes or trienes. Suitable diene and triene comonomers include 7-methyl-1,6-octadiene; 3,7-dimethyl-1,6-octadiene; 5,7-dimethyl-1,6-octadiene; 3,7,11-trimethyl-1,6, 10-octatriene; 6-methyl-1,5-heptadiene; 1,3-butadiene; 1,6- heptadiene; 1,7-octadiene; 1,8-nonadiene; 1,9-decadiene; 1,10-undecadiene; norbornene; tetracyclododecene; or mixtures thereof; and preferably butadiene; hexadienes; and octadienes; and most preferably 1,4-hexadiene; 1,9-decadiene; 4-methyl-1,4-hexadiene; 5-methyl-1,4-hexadiene; dicyclopentadiene; and 5-ethylidene-2-norbornene (ENB).

Additional unsaturated comonomers include 1,3-butadiene, 1,3-pentadiene, norbornadiene, and dicyclopentadiene; $C_{8-40}$ vinyl aromatic compounds including styrene, o-, m-, and p-methylstyrene, divinylbenzene, vinylbiphenyl, vinylnapthalene; and halogen-substituted $C_{8-40}$ vinyl aromatic compounds such as chlorostyrene and fluorostyrene.

The propylene copolymers of particular interest include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene.

Suitable polypropylenes are formed by means within the skill in the art, for example, using single site catalysts (metallocene or constrained geometry) or Ziegler Natta catalysts. The propylene and optional comonomers, such as ethylene or alpha-olefin monomers are polymerized under conditions within the skill in the art, for instance, as disclosed by Galli, et al., Angew. Macromol. Chem., Vol. 120, 73 (1984), or by E. P. Moore, et al. in Polypropylene Handbook, Hanser Publishers, New York, 1996, particularly pages 11-98.

The following are illustrative but non-limiting polypropylene polymers that can be used in the compositions of this invention: PROFAX™ SR-256M, a clarified polypropylene copolymer resin with a density of 0.90 g/cc and a MFR of 2 g/10 min, PROFAX™ 8623, an impact polypropylene copolymer resin with a density of 0.90 g/cc and a MFR of 1.5 g/10 min, and CATALLOY™ in-reactor blends of polypropylene (homo- or copolymer) with one or more of propylene-ethylene or ethylene-propylene copolymer, the blends having a wide range of densities and MFR, all available from Basell (Elkton, Md.); VERSIFY™ Plastomers and Elastomers available from The Dow Chemical Company and available as propylene/ethylene copolymers with densities ranging from 0.86 to 0.89 g/cc, and MFR ranging from 2 to 25 g/10 min; and INSPIRE™ D114 branched impact copolymer with a melt flow index of 0.5 dg/min (230 C/2.16 kg) and a melting point of 164 C and available from The Dow Chemical Company. Other polypropylene polymers include Shell's KF 6100 homopolymer polypropylene; Solvay's KS 4005 polypropylene copolymer and Solvay's KS 300 polypropylene terpolymer.

Preferably, the propylene-based polymer has a melt flow rate (MFR) in the range of 0.01 to 1000 g/10 min, more preferably in range of 0.1 to 500 g/10 min, and more preferably 1 to 100 g/10 min, as measured in accordance with ASTM D 1238 at 230 C/2.16 kg. In another embodiment, the propylene-based polymer may a melt flow rate (MFR, 230 C and 2.16 kg) from 0.1 to 150, preferably from 0.3 to 60, more preferably from 0.8 to 40 and most preferably from 0.8 to 25, g/10 min.

The propylene-based polymer used in the present invention may be of any molecular weight distribution (MWD). Propylene-based polymers of broad or narrow MWD are formed by means within the skill in the art. Propylene-based polymers having a narrow MWD can be advantageously provided by visbreaking or by manufacturing reactor grades (non visbroken) using single-site catalysis, or by both methods.

The propylene-based polymer can be reactor-grade, visbroken, branched or coupled to provide increased nucleation and crystallization rates. The term "coupled" is used herein to refer to propylene-based polymers which are rheology-modified, such that they exhibit a change in the resistance of the molten polymer to flow during extrusion (for example, in the extruder immediately prior to the annular die). Whereas "visbroken" is in the direction of chain-scission, "coupled" is in the direction of crosslinking or networking. As an example of coupling, a couple agent (for example, an azide compound) is added to a relatively high melt flow rate polypropylene polymer, such that after extrusion, the resultant polypropylene polymer composition attains a substantially lower melt flow rate than the initial melt flow rate. Preferably, for coupled or branched polypropylene, the ratio of subsequent MFR to initial MFR is less than, or equal, to 0.7:1, more preferably less than or equal to 0.2:1.

Suitable branched propylene-based polymers for use in the present invention are commercially available, for instance from Montell North America, under the trade designations Profax PF-611 and PF-814. Alternatively, suitable branched or coupled propylene-based polymers can be prepared by means, within the skill in the art, such as by peroxide or electron-beam treatment, for instance as disclosed by DeNicola et al. in U.S. Pat. No. 5,414,027 (the use of high energy (ionizing) radiation in a reduced oxygen atmosphere); EP 0 190 889 to Himont (electron beam irradiation of isotactic polypropylene at lower temperatures); U.S. Pat. No. 5,464,907 (Akzo Nobel NV); EP 0 754 711 Solvay (peroxide treatment); and U.S. patent application Ser. No. 09/133,576, filed Aug. 13, 1998 (azide coupling agents).

Suitable propylene/α-olefin interpolymers, containing at least 50 mol % polymerized propylene, fall within the invention. Suitable polypropylene base polymers include VERSIFY™ polymers (The Dow Chemical Company) and VISTAMAXX™ polymers (ExxonMobil Chemical Co.), LICOCENE™ polymers (Clariant), EASTOFLEX™ polymers (Eastman Chemical Co.), REXTAC™ polymers (Hunstman), and VESTOPLAST™ polymers (Degussa). Other suitable polymers include propylene/α-olefins block copolymers and interpolymers, and other propylene based block copolymers and interpolymers known in the art.

In another embodiment, the propylene-based polymer is a propylene/α-olefin interpolymer, which has a molecular weight distribution less than, or equal to, 5, or less than or equal to, 4, or less than or equal to 3. In another embodiment, the propylene/α-olefin interpolymer has a molecular weight distribution from 1 to 5, or from 1 to 4, or from 1 to 3.

In another embodiment, the propylene/α-olefin interpolymer has a melt flow rate (MFR) less than, or equal to 1000 g/10 min, typically less than or equal to 500 g/10 min, and more typically less than or equal to 100 g/10 min, and even more typically less than or equal to 50 g/10 min, as measured in accordance with ASTM D-1238 at 230° C./2.16 kg. In another embodiment, propylene/α-olefin interpolymer has a melt flow rate (MFR) greater than, or equal to 0.01 g/10 min, typically greater than or equal to 0.1 g/10 min, and more typically greater than or equal to 1 g/10 min, as measured in accordance with ASTM D-1238 at 230° C./2.16 kg.

In another embodiment, the propylene/α-olefin interpolymer has a melt flow rate (MFR) in the range of 0.01 to 1000 g/10 min, more typically in range of 0.01 to 500 g/10 min, more typically from 0.1 to 100 g/10 min, and even more typically from 0.1 to 50 g/10 min, as measured in accordance with ASTM D-1238 at 230° C./2.16 kg.

In another embodiment, the propylene/α-olefin interpolymer has a percent crystallinity of less than or equal to 50 percent, typically less than or equal to 40 percent, and more typically less than or equal to 35 percent, as measured by DSC. Preferably, these polymers have a percent crystallinity from 2 percent to 50 percent.

In another embodiment, the propylene/α-olefin interpolymer has a density less than, or equal to 0.96 g/cc, or less than or equal to 0.93 g/cc, or less than or equal to 0.90 g/cc. In another embodiment, the propylene/α-olefin interpolymer has a density greater than or equal to 0.83 g/cc, or greater than or equal to 0.84 g/cc, or greater than or equal to 0.85 g/cc. In another embodiment, the propylene/α-olefin interpolymer has a density from 0.84 g/cc to 0.93 g/cc, or from 0.85 g/cc to 0.92 g/cc.

The propylene copolymers of this invention typically comprise units derived from propylene in an amount of at least 60, or at least 80 or at least 85, weight percent of the copolymer. The typical amount of units derived from ethylene in propylene/ethylene copolymers is at least 0.1, or at least 1 or at least 5 weight percent, and the maximum amount of units derived from ethylene present in these copolymers is typically not in excess of 35, or not in excess of 30 or not in excess of 20, weight percent of the copolymer. The amount of units derived from the unsaturated comonomer(s), if present, is typically at least 0.01, or at least 1 or at least 5, weight percent, and the typical maximum amount of units derived from the unsaturated comonomer(s) typically does not exceed 35, or it does not exceed 30 or it does not exceed 20, weight percent of the copolymer. The combined total of units derived from ethylene and any unsaturated comonomer typically does not exceed 40, or it does not exceed 30 or it does not exceed 20, weight percent of the copolymer.

The copolymers of this invention comprising propylene and one or more unsaturated comonomers, other than ethylene, also typically comprise units derived from propylene in an amount of at least 60, or at least 70 or at least about 80, weight percent of the copolymer. The one or more unsaturated comonomers of the copolymer comprise at least 0.1, or at least 1 or at least about 3, weight percent, and the typical maximum amount of unsaturated comonomer does not exceed 40 or it does not exceed 30, weight percent of the copolymer.

In a preferred embodiment, these propylene-based polymers are made using a metal-centered, heteroaryl ligand catalyst in combination with one or more activators, e.g., an alumoxane. In certain embodiments, the metal is one or more of hafnium and zirconium. More specifically, in certain embodiments of the catalyst, the use of a hafnium metal has been found to be preferred as compared to a zirconium metal for heteroaryl ligand catalysts. The catalysts in certain embodiments are compositions comprising the ligand and metal precursor, and, optionally, may additionally include an activator, combination of activators or activator package.

The catalysts used to make the propylene-based polymers additionally include catalysts comprising ancillary ligand-hafnium complexes, ancillary ligand-zirconium complexes and optionally activators, which catalyze polymerization and copolymerization reactions, particularly with monomers that are olefins, diolefins or other unsaturated compounds. Zirconium complexes, hafnium complexes, compositions can be used. The metal-ligand complexes may be in a neutral or charged state. The ligand to metal ratio may also vary, the exact ratio being dependent on the nature of the ligand and metal-ligand complex. The metal-ligand complex or complexes may take different forms, for example, they may be monomeric, dimeric, or of an even higher order. Suitable catalyst structures and associated ligands are described in U.S. Pat. No. 6,919,407.

The propylene-based polymers can be made by any convenient process. In one embodiment, the process reagents, i.e., (i) propylene, (ii) ethylene and/or one or more unsaturated comonomers, (iii) catalyst, and, (iv) optionally, solvent and/or a molecular weight regulator (e.g., hydrogen), are fed to a single reaction vessel of any suitable design, for example, stirred tank, loop, or fluidized-bed. The process reagents are contacted within the reaction vessel under appropriate conditions (e.g., solution, slurry, gas phase, suspension, high pressure) to form the desired polymer, and then the output of the reactor is recovered for post-reaction processing. All of the output from the reactor can be recovered at one time (as in the case of a single pass or batch reactor), or it can be recovered in the form of a bleed stream, which forms only a part, typically a minor part, of the reaction mass (as in the case of a continuous process reactor, in which an output stream is bled from the reactor, at the same rate at which reagents are added to maintain the polymerization at steady-state conditions). "Reaction mass" means the contents within a reactor, typically during, or subsequent to, polymerization. The reaction mass includes reactants, solvent (if any), catalyst, and products and by-products. The recovered solvent and unreacted monomers can be recycled back to the reaction vessel. Suitable polymerization conditions are described in U.S. Pat. No. 6,919,407.

Polydiene-Based Polyurethane or Polydiol-Based Polyurethane Component:

The polydiene-based polyurethane of the present invention is thermoplastic and prepared from at least one of a functional polydiene. The polydiol-based polyurethane is thermoplastic and formed from at least one diol. The functional polydiene comprises at least one (preferably about 2) isocyanate-reactive group(s) attached at the ends of the molecule or attached pendantly within the molecule. This functionality may be any of the groups that react with isocyanates to form covalent bonds. This functionality preferably contains "active hydrogen atoms" with typical examples being hydroxyl, primary amino, secondary amino, sulfhydryl, and mixtures thereof. The term "active hydrogen atoms" refers to hydrogen atoms that, because of their placement in a molecule, display activity according to the Zerewitinoff test as described by Kohler in *J. Am. Chemical Soc.*, 49, 31-81 (1927), incorporated herein by reference. The content of the unsaturated segment in the polyurethane is from 1 to 95 wt %, and preferably from 10 to 50 wt %. In a preferred embodiment, the diol-based polyurethane component is prepared from a polydiene diol. In another embodiment of the invention, the diol-based polyurethane component is prepared from a functionalized polydiene, which contains isocyanate reactive groups other than hydroxyl. In still another embodiment, the diol-based polyurethane is prepared from a natural-sourced diol. The pd-TPU is then further blended with np-PO, e.g., an ethylene/α-olefin random interpolymer, olefin multi-block interpolymer, etc., as previously described.

In one embodiment, the polyurethane is a polydiene-based polyurethane. In a preferred embodiment, the polydiene-based polyurethane is a polydiene diol-based polyurethane. In a further embodiment, the polydiene diol-based polyurethane is a polybutadiene diol or polyisoprene diol or a combination thereof, and preferably a polybutadiene diol.

In another embodiment, the polyurethane is a polydiol-based polyurethane. In a further embodiment, the polydiol-based polyurethane is formed from at least one diol made from one or more seed-oil triglycerides selected from the group consisting of palmitic, stearic, oleic, linoleic and linolenic acid or ester.

Examples of the polydiol-based polyurethanes include, but are not limited to, polyurethanes formed from polyester polyols and seed oil-based polyols.

In one embodiment, the polydiene-based polyurethane and, preferably, a polydiene diol-based polyurethane, is formed from at least one aliphatic or cyclo-aliphatic diisocyanate.

In another embodiment, the polydiol-based polyurethane is formed from at least one aliphatic or cyclo-aliphatic diisocyanate. In yet a further embodiment, the polydiol-based polyurethane comprises at least one diol made from one or more seed oil triglycerides selected from the group consisting of palmitic, stearic, oleic, linoleic and linolenic acid or ester.

In another embodiment, the polydiol-based polyurethane is formed from a natural-sourced diol. As here used, "natural-sourced diol", "natural oil polyols" and like terms mean a diol derived from an agricultural product, e.g., seed oils such soy, sunflower, corn and canola. Such a diol may or may not contain dienic unsaturation. The composition of seed oil triglycerides is well understood. Triglycerides are fatty acid esters of glycerin, and the composition depends on the source of the oil. The nomenclature used is standard in the fats and oils industry, with the number of carbons in the fatty acid indicated first, followed by the number of sites of unsaturation in parentheses. Representative oils include palmitic, stearic, oleic, linoleic and linolenic. For the purpose of making polyols from these triglycerides, oils which contain a high level of unsaturation are desirable. Oils such as soy, canola and sunflower are acceptable due to the relatively low levels of saturated fatty acids that they contain, while feedstocks such as palm oil are considered unusable without further purification or refinement due to high levels of saturated fatty acids.

One method for preparing such functional polydienes is a two-step process in which a conjugated diene is grown by anionic polymerization from both ends of a difunctional initiator. The molecular weight of the polydiene is controlled by the molar ratio of the conjugated diene to the initiator. In the second step, the ends are then capped with alkylene oxide (such as ethylene or propylene oxide) to produce an unsaturated diol. This particular process is described in U.S. Pat. No. 4,039,593. In such processes, it is possible to add excess alkylene oxide and form short poly(alkylene oxide) chains at the ends of the polydiene. Such materials are within the scope of this invention.

The conjugated dienes used to prepare the functional polydiene typically contains from 4 to 24 carbons, and preferably from 4 to 8 carbons. Typical dienes include butadiene and isoprene, and typical functional polydienes are polybutadiene and polyisoprene capped at each end with ethylene oxide. These polydienes have at least one functional group per molecule, and typically have a number average molecular weight (Mn) from 500 to 10,000 grams per mole (g/mol), and preferably from 500 to 5,000 g/mol. The functional group is preferably a hydroxyl group. Two preferred polydiene diols are polybutadiene diol and polyisoprene diol, and more preferably polybutadiene diol.

In one embodiment, the at least one polydiene diol-based polyurethane is formed from a non-hydrogenated polydiene diol. In another embodiment, the at least one polydiene diol-based polyurethane is formed from a hydrogenated polydiene diol. In another embodiment, the at least one polydiene diol-based polyurethane is formed from a partially hydrogenated polydiene diol.

The term "hydrogenation" is known in the art, and is here used in reference to the hydrogenation (reaction of hydrogen with alkene groups) of double bonds within the polydiene diol, and is in reference to the final (hydrogenated) product. The term "hydrogenation" refers to the complete hydrogenation of all the double bonds, or the near complete hydrogenation (approximately greater than 95 mole percent) of the double bonds, within the polydiene diol. The term "partial hydrogenation," is used in reference to a hydrogenation reaction, and the final product, both in which a significant amount (approximately greater than 5 mole percent) of the double bonds, within the polydiene diol, are not hydrogenated.

The polyurethane used in the practice of the present invention is prepared by reacting the functional polydiene with an isocyanate and optionally a chain extender. In the 'prepolymer' method, typically one or more functional polydienes are reacted with one or more isocyanates to form a prepolymer. The prepolymer is further reacted with one or more chain extenders. Alternatively, the polyurethanes may be prepared by a one-shot reaction of all of the reactants. Typical polyurethanes have a number average molecular weight from 5,000 to 1,000,000 g/mol, and more preferably from 20,000 to 100,000 g/mol.

Some examples of polydiene diols, and corresponding polyurethanes, are described in Pytela et al, "Novel Polybutadiene Diols for Thermoplastic Polyurethanes", *International Polyurethane Conference*, PU Lat. Am. 2001; and in Pytela et al, "Novel Thermoplastic Polyurethanes for Adhesives and Sealants", *Adhesives & Sealant Industry*, June 2003, pp. 45-51. Some examples of some hydrogenated polydiene diols, and corresponding polyurethanes, are described in WO 99/02603, and corresponding European Patent EP 0 994 919 B1. As discussed in these references, the hydrogenation may be carried out by a variety of established processes, including hydrogenation in the presence of catalysts as Raney Nickel, noble metals, such as platinum, soluble transition metal catalysts and titanium catalysts, as in U.S. Pat. No. 5,039,755. Also, the polymers may have different diene blocks and these diene blocks may be selectively hydrogenated as described in U.S. Pat. No. 5,229,464.

Di-isocyanates suitable for use in preparing the hard segment of the polyurethanes according to this invention include aromatic, aliphatic, and cycloaliphatic di-isocyanates and combinations of two or more of these compounds. An example of a structural unit derived from di-isocyanate (OCN—R—NCO) is represented by formula (I) below:

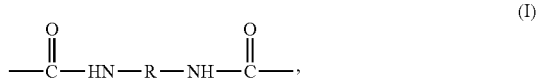

in which R is an alkylene, cycloalkylene, or arylene group. Representative examples of these di-isocyanates can be found in U.S. Pat. Nos. 4,385,133, 4,522,975 and 5,167,899. Preferred di-isocyanates include, but are not limited to, 4,4'-di-isocyanatodiphenylmethane, p-phenylene di-isocyanate, 1,3-bis(isocyanatomethyl)-cyclohexane, 1,4-di-isocyanato-cyclohexane, hexamethylene di-isocyanate, 1,5-naphthalene di-isocyanate, 3,3'-dimethyl-4,4'-biphenyl di-isocyanate, 4,4'-di-isocyanato-dicyclohexylmethane, and 2,4-toluene di-isocyanate. More preferred are 4,4'-di-isocyanato-dicyclohexylmethane and 4,4'-di-isocyanato-diphenylmethane. Most preferred is 4,4'-di-isocyanatodiphenylmethane.

Di-isocyanates also include aliphatic and cycloaliphatic isocyanate compounds, such as 1,6-hexamethylene-di-isocyanate; ethylene di-isocyanate; 1-isocyanato-3,5,5-trimethyl-1-3-isocyanatomethylcyclohexane; 2,4- and 2,6-hexahydro-toluenedi-isocyanate, as well as the corresponding isomeric mixtures; 4,4'-, 2,2'- and 2,4'-dicyclohexyl-methanedi-isocyanate, as well as the corresponding isomeric mixtures. Also, 1,3-tetramethylene xylene di-isocyanate can be used with the present invention. The isocyanate may be selected from organic isocyanates, modified isocyanates, isocyanate-based pre-polymers, and mixtures of two or more of these isocyanates.

In one embodiment, the polydiene-based polyurethane and, preferably, a polydiene diol-based polyurethane, is formed from at least one aliphatic or cyclo-aliphatic diisocyanate.

In another embodiment, the polydiol-based polyurethane is formed from at least one aliphatic or cyclo-aliphatic diisocyanate. In yet a further embodiment, the polydiol-based polyurethane comprises at least one diol made from one or more seed oil triglycerides selected from the group consisting of palmitic, stearic, oleic, linoleic and linolenic acid or ester As discussed above, the polyurethanes can be prepared by mixing all ingredients, at essentially the same time in a "one-shot" process, or can be prepared by step-wise addition of the ingredients in a "prepolymer process," with the processes being carried out in the presence of, or without the addition of, optional additives. The polyurethane forming reaction can take place in bulk, or in solution, with, or without, the addition of a suitable catalyst that would promote the reaction of isocyanates with hydroxyl or other functionality. Examples of a typical preparation of these polyurethanes are described in U.S. Pat. No. 5,864,001.

The other main component of the hard segment of the polyurethanes of the present invention is at least one chain extender, which are well know in this technology field. As is known, when the chain extender is a diol, the resulting product is a thermoplastic polyurethane (TPU). When the chain extender is a diamine or an amino alcohol, the resulting product is technically a thermoplastic polyurea (TPUU).

The chain extenders that may be used in the invention are characterized by two or more, preferably two, functional groups, each of which contains "active hydrogen atoms." These functional groups are preferably in the form of hydroxyl, primary amino, secondary amino, or mixtures of two or more of these groups. The term "active hydrogen atoms" refers to hydrogen atoms that, because of their placement in a molecule, display activity according to the Zerewitinoff test as described by Kohler in *J. Am. Chemical Soc.*, 49, 31-81 (1927).

The chain extenders may be aliphatic, cycloaliphatic, or aromatic and are exemplified by diols, diamines, and amino alcohols. Illustrative of the difunctional chain extenders are ethylene glycol, diethylene glycol, propylene glycol, dipropylene glycol, 1,3-propanediol, 1,3-butanediol, 1,4-butanediol, 1,5-pentanediol and other pentane diols, 2-ethyl-1,3-hexanediol, 2-ethyl-1,6-hexanediol, other 2-ethyl-hexanediols, 1,6-hexanediol and other hexanediols, 2,2,4-trimethylpentane-1,3-diol, decanediols, dodecanediols, bisphenol A, hydrogenated bisphenol A, 1,4-cyclohexanediol, 1,4-bis(2-hydroxyethoxy)-cyclohexane, 1,3-cyclohexanedimethanol, 1,4-cyclohexanediol, 1,4-bis(2-hydroxyethoxy)benzene, Esterdiol 204 (propanoic acid, 3-hydroxy-2,2-dimethyl-, 3-hydroxy-2,2-dimethylpropyl ester available from TCI America), N-methylethanolamine, N-methyl isopropylamine, 4-aminocyclohexanol, 1,2-diaminotheane, 1,3-diaminopropane, diethylenetriamine, toluene-2,4-diamine, and toluene-1,6-diamine. Aliphatic compounds containing from 2 to 8 carbon atoms are preferred. If thermoplastic or soluble polyurethanes are to be made, the chain extenders will be difunctional in nature. Amine chain extenders include, but are not limited to, ethylenediamine, monomethanolamine, and propylenediamine.

Commonly used linear chain extenders are generally diol, diamine or amino alcohol compounds characterized by having a molecular weight of not more than 400 g/mol (or Dalton). In this context, by "linear" it is meant that no branching from tertiary carbon is included. Examples of suitable chain extenders are represented by the following formulae: HO—$(CH_2)_n$—OH, $H_2N$—$(CH_2)_n$—$NH_2$, and $H_2N$—$(CH_2)_n$—OH, where "n" is typically a number from 1 to 50.

One common chain extender is 1,4-butane diol ("butane diol" or "BDO"), and is represented by the following formula: HO—$CH_2CH_2CH_2CH_2$—OH. Other suitable chain extenders include ethylene glycol; diethylene glycol; 1,3-propanediol; 1,6-hexanediol; 1,5-heptanediol; triethyleneglycol; and combinations of two or more of these extenders.

Also suitable, are cyclic chain extenders which are generally diol, diamine or amino alcohol compounds characterized by having a molecular weight of not more than 400 g/mol. In this context, by "cyclic" it is meant a ring structure, and typical ring structures include, but are not limited to, the 5 to 8 member ring structures with hydroxyl-alkyl branches. Examples of cyclic chain extender are represented by the following formulae: HO—R-(ring)-R'—OH and HO—R—O-(ring)-O—R'—OH, where R and R' are one to five carbon alkyl chains, and each ring has 5 to 8 members, preferably all carbons. In these examples, one or both of the terminal —OH can be replaced with —$NH_2$. Suitable cyclic chain extenders include cyclohexane dimethanol ("CHDM") and hydroquinone bis-2-hydrxyethyl ether (HQEE). A structural unit of CHDM, a preferred cyclic chain extender, is represented by the following formula: HO—$CH_2$— (cyclohexane ring)-$CH_2$—OH.

The chain extender is incorporated into the polyurethane in amounts determined by the selection of the specific reactant components, the desired amounts of the hard and soft segments and the index sufficient to provide good mechanical properties, such as modulus and tear strength. The polyurethane compositions used in the practice of this invention may contain from 2 to 25, preferably from 3 to 20 and more preferably from 4 to 18, wt % of the chain extender component.

If desired, optionally, small amounts of monohydroxyl-functional or monoaminofunctional compounds, often termed "chain stoppers," may be used to control molecular weight. Illustrative of such chain stoppers are the propanols, butanols, pentanols, and hexanols. When used, chain stoppers are typically present in minor amounts from 0.1 to 2 wt % of the entire reaction mixture leading to the polyurethane composition.

As is well known to those skilled in the art, the ratio of isocyanate to total functional groups determines the Mn of the polymer. In some cases it is desirable to use a very slight excess of isocyanate.

For linear, high Mn polymers, starting materials with two functional groups per chain are desirable. However, it is possible to accommodate starting materials with a range of functionality. For example, a polydiene with one functional end could be used to cap both ends of a polyurethane with the middle portion consisting of repeating isocyanate-chain extender moieties. Polydienes with more than two functional groups will form branched polymers. Although crosslinking and gels can be a problem, if the degree of functionality is too high, this can usually be controlled by process conditions.

Such branched polymers will exhibit some rheological characteristics that are desirable in some cases, such as high melt strength.

Optionally, catalysts that will promote or facilitate the formation of urethane groups may be used in the formulation. Illustrative of useful catalysts are stannous octanoate, dibutyltin dilaurate, stannous oleate, tetrabutyltin titanate, tributyltin chloride, cobalt naphthenate, dibutyltin oxide, potassium oxide, stannic chloride, N,N,N,N'-tetramethyl-1,3-butanediamine, bis[2-(N,N-dimethylamino)ethyl]ether, 1,4-diazabicyclo[2.2.2]octane; zirconium chelates, aluminum chelates and bismuth carbonates. The catalysts, when used, are typically employed in catalytic amounts that may range from 0.001 wt %, and lower, to 2 wt %, and higher, based on the total amount of polyurethane-forming ingredients.

Additives may be used to modify the properties of the polyurethane used in the practice of this invention. Additives may be included in the conventional amounts as already known in the art and literature. Usually additives are used to provide specific desired properties to the polyurethanes such as various antioxidants, ultraviolet inhibitors, waxes, thickening agents and fillers. When fillers are used, they may be either organic or inorganic, but are generally inorganic such as clay, talc, calcium carbonate, silica and the like. Also, fibrous additives, such as glass or carbon fiber, may be added to impart certain properties.

In a preferred embodiment of the invention, the polyurethane is formed from a polydiene diol, an isocyanate and a chain extender, and preferably an aliphatic chain extender. In another embodiment, the polydiene diol-based polyurethane is hydrogenated. In another embodiment, the isocyanate is an aliphatic or cyclo-aliphatic isocyanate.

In a further embodiment, the polydiene diol is formed from conjugated dienes having 4 to 24 carbons, and preferably having 4 to 8 carbons. As discussed above, typical dienes include butadiene and isoprene, and typical polydienes include polybutadiene and polyisoprene, and hydrogenated polybutadiene and hydrogenated polyisoprene. In a preferred embodiment, these polydienes have at least one, and more preferably at least two, hydroxyl groups in the molecule, and typically have a Mn from 500 to 10,000, more preferably from 1,000 to 5,000 and even more preferably from 1,500 to 3,000 g/mol. Preferably, the polydiene diol is a polybutadiene diol or a polyisoprene diol, and more preferably a polybutadiene diol.

In another embodiment, the polydiene diol-based polyurethane is formed from a composition comprising 15 to 40 wt % of di-isocyanate, 50 to 75 wt % of a polydiene diol, and 5 to 15 wt % of a chain extender. In a further embodiment, the polydiene diol is a polybutadiene diol or a polyisoprene diol, and preferably is a polybutadiene diol. In a further embodiment, the di-isocyanate is an aliphatic or aromatic di-isocyanate, and more preferably 4,4'-diphenylmethane di-isocyanate. In another embodiment, the diisocyanate is an aliphatic or cyclo-aliphatic diisocyanate. In yet a further embodiment, the chain extender is an aliphatic diol. In another embodiment, the polydiene diol has a Mn from 500 to 10,000, more preferably from 1,000 to 5,000 and even more preferably from 1,500 to 3,000, g/mol. In another embodiment, the polydiene diol is non-hydrogenated. In another embodiment, the polydiene diol is hydrogenated. In another embodiment, the polydiene diol is partially hydrogenated.

The polyurethane component of the compositions used in the practice of the invention may contain a combination of two or more embodiments as described above.

Additives such as process oils, slip agents, anti-block, AO, UV, fillers, may be added to the inventive compositions. Typically the composition will contain one or more stabilizers, for example, antioxidants, such as Irganox™ 1010 and Irgafos™ 168, both supplied by Ciba Specialty Chemicals. An example of a hindered phenolic antioxidant is Irganox® 1076 antioxidant, available from Ciba-Geigy Corp. Polymers are typically treated with one or more stabilizers before an extrusion or other melt processes. Other polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents and anti-blocking agents. Additional additives include, but not limited to, surface tension modifiers, pigments, process oil, wax, blowing agents, anti-block agents, foaming agents, antistatic agents, release agents, blowing agents, foaming agents, antistatic agents, release agents, flame resistant agents, abrasion and scratch mar additives, antimicrobial agents, antistatic agents, and crosslinking agents.

An inventive composition can comprise a combination of two or more embodiments as described herein.

A polymer component of an inventive composition can comprise a combination of two or more embodiments as described herein.

An inventive method may comprise a combination of two or more embodiments as described herein.

An inventive article may comprise a combination of two or more embodiments as described herein.

Applications:

In one embodiment, the invention is a method for imparting high frequency (HF) weldability and/or printability to an article comprising a low surface energy, i.e., a nonpolar, material. HF-weldability can allow polyolefin sheets or films to be used in applications such as roofing membranes, stationary, artificial leather, etc., in which polyolefins are desirable due to cost/performance advantages and recyclability. The materials and procedures of HF-welding are known in the art, and are generally described in US2004/0077791. Known methods include the addition of a zeolite or a resin containing polar functionality, e.g., a MAH-grafted resin, or an EAA, EEA, EMA, EBA or EMAA copolymer, to a nonpolar olefinic resin before the nonpolar polymer is subjected to HF-welding or printing. However, these methods generally provide poor weldability and/or printability results relative to the results from this embodiment of the invention under like conditions using like amounts of like materials.

The nonpolar material is typically an ethylene- or propylene-based homopolymer or interpolymer or a blend of the same, although any nonpolar polymeric material, particularly a nonpolar olefinic material, can be used in the practice of this invention. The method comprises the step of admixing with the nonpolar material an amount, e.g., less than 50, typically between 1 and 40, preferably between 3 and 30 and more preferably between 5 and 25, wt % of polydiol-based polyurethane, particularly a polydiene diol based polyurethane, based on the combined weight of the nonpolar material and the polydiene/TPU. The blends used in the practice of this invention can contain one or more additives such as, but not limited to, antioxidants, lubricants, fillers, flame retardants, oils, crosslinking agents, UV-stabilizers and the like. These additives are used in known ways and in known amounts.

In one embodiment, the polyurethane is a polydiene-based polyurethane. In a preferred embodiment, the polydiene-based polyurethane is a polydiene diol-based polyurethane. In a further embodiment, the polydiene diol-based polyurethane is a polybutadiene diol or polyisoprene diol or a combination thereof, and preferably a polybutadiene diol.

In another embodiment, the polyurethane is a polydiol-based polyurethane. In a further embodiment, the polydiol-based polyurethane formed from at least one diol made from one or more seed oil triglycerides selected from the group consisting of palmitic, stearic, oleic, linoleic and linolenic acid or ester.

Examples of the polydiol-based polyurethanes include, but are not limited to, polyurethanes formed from polyester polyols and seed oil-based polyols.

In one embodiment, the polydiene-based polyurethane and, preferably, a polydiene diol-based polyurethane, is formed from at least one aliphatic or cyclo-aliphatic diisocyanate.

In another embodiment, the polydiol-based polyurethane is formed from at least one aliphatic or cyclo-aliphatic diisocyanate. In yet a further embodiment, the polydiol-based polyurethane comprises at least one diol made from one or more seed oil triglycerides selected from the group consisting of palmitic, stearic, oleic, linoleic and linolenic acid or ester.

In another embodiment, the invention is a method for imparting at least one of paintability, printability, dyeability and over-moldability to an article comprising a low surface energy material. In this embodiment, a polydiene-based polyurethane or a polydiol-based polyurethane is added to a non-polar material, e.g., a thermoplastic polyolefin (TPO), to promote the adhesiveness between the nonpolar material and a paint, ink, dye or polar substrate. Since polyurethanes are more polar resins than TPOs, a blend of a polyurethane with TPO imparts significant functionality in the context of toluene or ketone-based paints or water-based paints. Polybutadiene diol-based polyurethanes and natural-sourced diols are compatible with TPOs. By compounding a TPO, e.g., ENGAGE® 8200 polyethylene, with polybutadiene diol based TPU PRO 7840 available from Sartomer, in a blend weight ratio of 70:30, or 60:40 or 50:50, an injection molded article is paintable with a wide variety of paint formulations. The polydiene-based polyurethane or polydiol-based polyurethane and np-PO are typically compounded using an extruder and at a temperature between about 170-190, preferably between about 175-185, C. Typical injection molding speeds are between about 20-100, preferably between about 40-100 and more preferably between about 80-100, cubic centimeters per second (cm$^3$/sec).

In one embodiment, the polyurethane is a polydiene-based polyurethane. In a preferred embodiment, the polydiene-based polyurethane is a polydiene diol-based polyurethane. In a further embodiment, the polydiene diol-based polyurethane is a polybutadiene diol or polyisoprene diol or a combination thereof, and preferably a polybutadiene diol.

In another embodiment, the polyurethane is a polydiol-based polyurethane. In a further embodiment, the polydiol-based polyurethane formed from at least one diol made from one or more seed oil triglycerides selected from the group consisting of palmitic, stearic, oleic, linoleic and linolenic acid or ester.

Examples of the polydiol-based polyurethanes include, but are not limited to, polyurethanes formed from polyester polyols and seed oil-based polyols.

In one embodiment, the polydiene-based polyurethane and, preferably, a polydiene diol-based polyurethane, is formed from at least one aliphatic or cyclo-aliphatic diisocyanate.

In another embodiment, the polydiol-based polyurethane is formed from at least one aliphatic or cyclo-aliphatic diisocyanate. In yet a further embodiment, the polydiol-based polyurethane comprises at least one diol made from one or more seed oil triglycerides selected from the group consisting of palmitic, stearic, oleic, linoleic and linolenic acid or ester.

This embodiment of the invention works well with a wide variety of paint formulations. The major components of solvent-borne paints and coatings are solvents, binders, pigments, and additives. In paint, the combination of the binder and solvent is referred to as the paint vehicle. Pigment and additives are dispersed within the vehicle. The amount of each constituent varies with the particular paint, but solvents traditionally make up about 60% of the total formulation. Typical solvents include toluene, xylene, methyl ethyl ketone, methyl isobutyl ketone and water. Binders account for about 30 wt %, pigments for 7 to 8 wt %, and additives for 2 to 3 wt %. Some of the polymers and other additives used in paint formulations include: acrylic polymers, alkyd resins, cellulose based materials such as cellulose acetate butyrate, melamine resins, carbamate resins, polyester resins, vinyl acetate resins, urethane resins, polyols, alcohols, inorganic materials such as titanium dioxide (rutile), mica flakes, iron oxide, silica, aluminum and the like.

These polydiene-based polyurethane or polydiol-based polyurethanes and np-PO compositions have other uses as well. By way of non-limiting examples, these compositions promote the adhesion between (i) PU-thermoset foams and polyolefin elastomers (POE), particularly as a tie layer between extruded sheets, films or profiles, (ii) POE and polydiene-based polyurethane or polydiol-based polyurethane blown films; (iii) neat TPU and POE, (iv) butadiene rubber and TPU or a thermoplastic vulcanate (TPV) such as those described in EP 0 468 947; (v) nylon or another polar plastic and crosslinked chlorinated polyethylene or EPDM in extrusion or molding processes, (vi) polypropylene and TPU fibers, e.g., in carpet, artificial turf, etc. (vii) polar fillers and nonpolar materials, e.g., wire and cable insulation, coatings, etc., (viii) hot melt adhesives and polar substrates, (ix) POE and polydiene-based polyurethane or a polydiol-based polyurethane in molded articles, e.g., footwear and automotive, and (x) aqueous dispersions from which various articles can be produced, e.g., film.

In one embodiment, the polyurethane is a polydiene-based polyurethane. In a preferred embodiment, the polydiene-based polyurethane is a polydiene diol-based polyurethane. In a further embodiment, the polydiene diol-based polyurethane is a polybutadiene diol or polyisoprene diol or a combination thereof, and preferably a polybutadiene diol.

In another embodiment, the polyurethane is a polydiol-based polyurethane. In a further embodiment, the polydiol-based polyurethane formed from at least one diol made from one or more seed oil triglycerides selected from the group consisting of palmitic, stearic, oleic, linoleic and linolenic acid or ester.

Examples of the polydiol-based polyurethanes include, but are not limited to, polyurethanes formed from polyester polyols and seed oil-based polyols.

In one embodiment, the polydiene-based polyurethane and, preferably, a polydiene diol-based polyurethane, is formed from at least one aliphatic or cyclo-aliphatic diisocyanate.

In another embodiment, the polydiol-based polyurethane is formed from at least one aliphatic or cyclo-aliphatic diisocyanate. In yet a further embodiment, the polydiol-based polyurethane comprises at least one diol made from one or more seed oil triglycerides selected from the group consisting of palmitic, stearic, oleic, linoleic and linolenic acid or ester.

In one embodiment, the dispersions of this invention can be prepared by dispersing the TPU (based on any non-polar polyol) in a previously prepared polyolefin dispersion, i.e., the polyolefin dispersion serves as the aqueous phase in the dispersion process.

In other embodiments, the dispersion can be prepared by:
a) Preparing a polyurethane prepolymer using a non-polar polyol such as polybutadiene diol or a seed-oil based polyester polyol, and a diisocyanate, or
b) Dispersing the polyurethane prepolymer in an aqueous phase comprising a polyolefin dispersion and chain extender; the polyurethane prepolymer can be dispersed in the aqueous phase by incorporating a suitable surfactant or by making the prepolymer self-dispersing using a conventional functionalization approach, or
c) Physically blending a polyolefin dispersion and a polyurethane dispersion prepared using a non-polar polyol, such as polybutadiene diol or a seed-oil based polyol, or
d) Following the procedures of US 2005/0100754, incorporated herein by reference, or
e) Dispersing a pre-blend of an inventive composition, or post blending two or more dispersions.

In one embodiment, each polyurethane component of the dispersion is formed, independently, from an aliphatic isocyanate.

The dispersions of these compositions can also be used as paint adhesion promoters for non-polar thermoplastic and thermoset parts for automotive exteriors and interiors. They can also be used as primers for painting or printing of non-polar plastic parts for toys, and other molded or extruded parts and films.

The invention also provides a footwear article comprising at least one component formed from an inventive composition. In one embodiment, the article is selected from the group consisting of shoe outsole, shoe midsole, shoe unit-sole, an over-molded article, a natural leather article, a synthetic leather article, an upper, a laminated article, a coated article, a boot, a sandal, galoshes, a plastic shoe, and combinations thereof.

The inventive compositions may also be used in dispersions, such as water-based dispersions for use as primers in olefinic footwear that promote adhesion to PU glues and leather; fabric coating adhesion (adhesion to PET, Nylon, PP, elastomer rich TPO comprising of POE, EPDM or other non-polar elastomers or combination thereof etc.).

The inventive compositions can be used in the following footwear applications: (a) outsoles, mid-soles and stiffeners, to be assembled with standard polyurethane adhesive systems currently used by footwear industry, (b) painting of soles and mid-soles with polyurethane paints, currently used by footwear industry, and (c) over-molding of polyolefins and bi-component polyurethanes for multilayered soles and mid-soles.

The substrates to which the blends can be applied include a wide range of materials, both polar and nonpolar, such as but not limited to polymers, metal, wood, concrete, glass, ceramic and various composites of two or more of these materials. Alternatively, these materials can be applied to an article comprising the blend. Application methods include painting, printing, dying, over-molding and the like, including the many variations on each, e.g., spreading, spraying, dipping, extrusion, etc. The blends can be crosslinked before, during or after application to a substrate, and they can be crosslinked in any convenient manner, e.g., peroxide, sulfur, moisture, silane, radiation, heat and the like. In one embodiment, the blend is applied to a substrate, and the blend is crosslinked as it is applied and/or after it is applied. For crosslinking, the PO/polydiene-based polyurethane blend will usually contain unsaturation, e.g., a diene-containing PO and/or non-hydrogenated TPU.

In one embodiment, the polyurethane is a polydiene-based polyurethane. In a preferred embodiment, the polydiene-based polyurethane is a polydiene diol-based polyurethane. In a further embodiment, the polydiene diol-based polyurethane is a polybutadiene diol or polyisoprene diol or a combination thereof, and preferably a polybutadiene diol.

In another embodiment, the polyurethane is a polydiol-based polyurethane. In a further embodiment, the polydiol-based polyurethane formed from at least one diol made from one or more seed oil triglycerides selected from the group consisting of palmitic, stearic, oleic, linoleic and linolenic acid or ester.

Examples of the polydiol-based polyurethanes include, but are not limited to, polyurethanes formed from polyester polyols and seed oil-based polyols.

In one embodiment, the polydiene-based polyurethane and, preferably, a polydiene diol-based polyurethane, is formed from at least one aliphatic or cyclo-aliphatic diisocyanate.

In another embodiment, the polydiol-based polyurethane is formed from at least one aliphatic or cyclo-aliphatic diisocyanate. In yet a further embodiment, the polydiol-based polyurethane comprises at least one diol made from one or more seed oil triglycerides selected from the group consisting of palmitic, stearic, oleic, linoleic and linolenic acid or ester.

Films (typically less than 4 mil in thickness) and sheet structures (typically 4 or more mil in thickness) are also readily prepared from a blend of np-PO and a polydiene-based polyurethane or a polydiol-based polyurethane. The film or sheet can be monolayer or multilayer and if a multilayer film of three or more layers, then at least one inner layer of the film or structure comprises a blend of an np-PO and a polydiene-based polyurethane or a polydiol-based polyurethane. This inner layer can serve as a tie layer between a polar layer and a nonpolar layer, e.g., between a polyester layer and a polyolefin layer. Multilayer films and sheet structures containing the inventive blend as a tie layer between polar and nonpolar layers impart good strength, and good impact, puncture and tear resistance to the overall film or sheet.

In one embodiment, the polyurethane is a polydiene-based polyurethane. In a preferred embodiment, the polydiene-based polyurethane is a polydiene diol-based polyurethane. In a further embodiment, the polydiene diol-based polyurethane is a polybutadiene diol or polyisoprene diol or a combination thereof, and preferably a polybutadiene diol.

In another embodiment, the polyurethane is a polydiol-based polyurethane. In a further embodiment, the polydiol-based polyurethane formed from at least one diol made from one or more seed oil triglycerides selected from the group consisting of palmitic, stearic, oleic, linoleic and linolenic acid or ester.

Examples of the polydiol-based polyurethanes include, but are not limited to, polyurethanes formed from polyester polyols and seed oil-based polyols.

In one embodiment, the polydiene-based polyurethane and, preferably, a polydiene diol-based polyurethane, is formed from at least one aliphatic or cyclo-aliphatic diisocyanate.

In another embodiment, the polydiol-based polyurethane is formed from at least one aliphatic or cyclo-aliphatic diisocyanate. In yet a further embodiment, the polydiol-based polyurethane comprises at least one diol made from one or more seed oil triglycerides selected from the group consisting of palmitic, stearic, oleic, linoleic and linolenic acid or ester.

In one embodiment, the polydiene-based polyurethane or a polydiol-based polyurethane serves as a tie layer between polar and nonpolar materials, particularly between polar and nonpolar polymeric materials, e.g., between a film layer of a np-PO such as polyethylene or polypropylene and a film layer of a polar polymer such as polylactic acid (PLA) or polyamide or polyester. The d-TPUs of this invention are particularly well suited as tie layers for binding a polyethylene or polypropylene film or surface of a molded article to a film or surface of a molded article of an ethylene/acrylic acid copolymer (EAA) or PLA or polyethylene terephthalate (PET). Any processes that combine co-extrusion, extrusion lamination, adhesive lamination, and/or foam casting or extrusion can be used to create these laminated structures, including structures in which the d-TPU comprises foam.

In one embodiment, the polyurethane is a polydiene-based polyurethane. In a preferred embodiment, the polydiene-based polyurethane is a polydiene diol-based polyurethane. In a further embodiment, the polydiene diol-based polyurethane is a polybutadiene diol or polyisoprene diol or a combination thereof, and preferably a polybutadiene diol.

In another embodiment, the polyurethane is a polydiol-based polyurethane. In a further embodiment, the polydiol-based polyurethane formed from at least one diol made from one or more seed oil triglycerides selected from the group consisting of palmitic, stearic, oleic, linoleic and linolenic acid or ester.

Examples of the polydiol-based polyurethanes include, but are not limited to, polyurethanes formed from polyester polyols and seed oil-based polyols.

In one embodiment, the polydiene-based polyurethane and, preferably, a polydiene diol-based polyurethane, is formed from at least one aliphatic or cyclo-aliphatic diisocyanate.

In another embodiment, the polydiol-based polyurethane is formed from at least one aliphatic or cyclo-aliphatic diisocyanate. In yet a further embodiment, the polydiol-based polyurethane comprises at least one diol made from one or more seed oil triglycerides selected from the group consisting of palmitic, stearic, oleic, linoleic and linolenic acid or ester.

Suitable polyester resins include poly(lactic acid), poly(lactide), poly(glycolide), poly(hydroxy butyrate), poly(hydroxy butyrate-co-hydroxy valerate), poly(caprolactone), poly(ethylene-oxylate), poly(1,5-dioxepan 2-one), poly(1,4-dioxepan 2-one), poly(p-dioxanone), poly(delta-valerolactone), polyethylene(oxylate), polyethylene(succinate), polybutylene(oxalate), polybutylene(succinate), polypentamethyl(succinate), polyhexamethyl(succinate), polyheptamethyl(succinate), polyoctamethyl(succinate), polyethylene(succinate-co-adipate), polybutylene(succinate-co-adipate), polybutylene(oxylate-co-succinate) and polybutylene(oxylate-co-adipate). Especially preferred is poly(lactic acid).

Suitable polyolefin layers can comprise one or more of a number of different polyolefins, e.g., low density PE, linear low density PE, high density PE, ethylene/alpha-olefin copolymers, polypropylene homopolymer, impact-modified polypropylene, random copolymer polypropylene, propylene-ethylene copolymers, and the like. These polyolefins can be heterogeneous or homogeneous polyolefins or a blend of the two.

The film layers are made from film-forming polymers, i.e., polymers of sufficient molecular weight such that they can be cast, blown, extruded or the like into a film or sheet. The molecular weight is not so large, however, that the polymer exhibits a viscosity unsuitable for use in the film-forming equipment. Moreover, it should be appreciated that the molecular weights of the polymers used to provide the various layers can be different reflecting the desired properties of the individual layers.

The films and sheet structures, whether mono- or multilayer, can be formed by any conventional process including cast film co-extrusion, blown film co-extrusion, and the lamination of two films in which one is comprised of a multilayer structure comprising a layer comprising a blend of an np-PO and a d-TPU that serves as a tie layer between a polyester layer and a polyolefin layer.

The invention provides an article comprising at least one component formed from an inventive composition. In a further embodiment, the article is an sheet, a carpet, artificial turf, an adhesive, a wire sheath, a cable, a protective apparel, an automotive part, a footwear component, a coating, or a foam laminate, an automotive skin, an awning, a tarp, a roofing construction article, a steering wheel, a powder coating, a powder slush molding, a consumer durable, a grip, a handle, a computer component, a belt, an appliqué, a footwear component, a conveyor or timing belt, a fabric, a pellet (particularly a pellet with a softening point of about 90° C.), fiber (including bicomponent fibers and coatings for fibers) and the like.

The invention also provides a molded article comprising a first component and a second component, and wherein the first component is formed from an composition comprising a polar polymer, and wherein the second component is formed from an inventive composition. In a further embodiment, the article is in the form of an automobile skin, an appliqué, a footwear component, a conveyor belt, a timing belt or a consumer durable.

The invention also provides a molded article comprising a first component and a second component, and wherein the first component is formed from a composition comprising a polar polymer, and wherein the second component is formed from an inventive composition. In a further embodiment, the article is in the form of an automobile skin, an appliqué, a footwear component, a conveyor belt, a timing belt, artificial leather, or a consumer durable. The invention provides an automotive part comprising at least one component formed from an inventive composition, including, but not limited to, instrument panels, door panels, airbags, head rests, arm rests, headliners, and carpet components, such as a carpet underlayment.

The invention also provides a footwear article comprising at least one component formed from an inventive composition. In a further embodiment, the article is selected from the group consisting of shoe outsole, shoe midsole, shoe unitsole, an over-molded article, a natural leather article, a synthetic leather article, an upper, a laminated article, a coated article, a boot, a sandal, galoshes, a plastic shoe, and combinations thereof.

In particular, the inventive compositions can be used in the following applications: (a) outsoles, mid-soles and stiffeners, to be assembled with standard polyurethane adhesive systems currently used by footwear industry, (b) painting of soles and mid-soles with polyurethane paints, currently used by footwear industry, and (c) over-molding of polyolefins and bi-component polyurethanes for multilayered soles and mid-soles. In addition, the inventive compositions can be used in other applications, such as automotive applications and construction applications. Automotive applications include, but are not limited to, the manufacture of bumper fascias, vertical panels, soft TPO skins, and interior trim. Construction applications include, but are not limited to, the manufacture of furniture and toys.

"In-line compounding process" and like terms mean a process, typically continuous, in which the components of the composition are continuously fed to and mixed within an extruder or like piece of equipment from which a composition comprising the mixed components is discharged and, optionally, is further processed into an article of manufacture, e.g., a film, sheet, fiber, etc.

In one embodiment, the invention provides a method of making an inventive composition the method comprising melt mixing the polyolefin and polyurethane components. In a further embodiment, the components are mixed simultaneously. In another embodiment, the components are mixed sequentially, in any order. In yet another embodiment, the melt mixing takes place in an extruder. In still another embodiment, the melt mixing takes place in an "in-line" compounding process.

The following examples illustrate the invention but do not explicitly or implicitly limit the invention. Unless noted to the contrary, all parts and percentages are by weight.

Specific Embodiments

Test Methods:

Density is determined in accordance with American Society for Testing and Materials (ASTM) procedure ASTM D792-00, Method B.

Melt index ($I_2$) in g/10 min, is measured using ASTM D-1238-04 (version C), Condition 190 C/2.16 kg. The notation "$I_{10}$" refers to a melt index, in g/10 min, measured using ASTM D-1238-04, Condition 190 C/10.0 kg. The notation "121" refers to a melt index, in g/10 min, measured using ASTM D-1238-04, Condition 190 C/21.6 kg. Polyethylene is typically measured at 190 C while polypropylene is typically measured at 230 C. MFR means melt flow rate for propylene based polymers and is measured using ASTM D-1238 condition 230 C/2.16 kg. For urethane based polymers, including blend comprising such polymers, except PELLETHANE™ polymers, melt index is measured according to ASTM D-1238 condition 190 C/2.16 kg. For PELLETHANE™ melt flow rate is measured according to ASTM D-1238 condition 230 C/8.7 kg.

Differential Scanning Calorimeter (DSC) is performed using a TAI model Q1000 DSC equipped with an RCS cooling accessory and an auto-sampler. A nitrogen purge gas flow of 50 cc/min is used. The sample is pressed into a thin film and melted in the press at about 175 C and then air-cooled to room temperature (25 C). Material (3-10 mg) is then cut into a 3 mm diameter disk, accurately weighed, placed in a light aluminum pan (ca 50 mg), and then crimped shut. The thermal behavior of the sample is investigated with the following temperature profile. The sample is rapidly heated to 180 C and held isothermally for 3 minutes in order to remove any previous thermal history. The sample is then cooled to −90 C at 10 C/min cooling rate and held at −90 C for 3 minutes. The sample is then heated to 150 C at 10 C/min heating rate. The cooling and second heating curves are recorded.

Ultimate tensile strength and elongation at break are measured according to ASTM D-638-03. Both measurements are performed at 23 C on die-cut D638-type IV specimens.

Surface tension is measured in accordance with ASTM D-3359, Method B, and DIN 53364 (1986). ARCOTEC™ test inks are used, which are fluids of defined surface tension, and are available in ranges from 28 to 56 mN/m. Tests are run at room temperature (23 C).

Surface energy is measured using ARCOTEC™ test inks and test pens available from Lotar Enterprises. As a starting point for each check a test ink or test pen with a medium value should be applied, e.g., 38 mN/m (dyne/cm). If the line of ink stays unchanged for at least 2 seconds on the surface of the material without turning into droplets, the surface energy of the material is the same or higher than the surface tension of the fluid. In this case, the test ink/test pen with the next higher value is applied to the surface, e.g., 40 mN/m (dyne/cm). This check has to be repeated with the next higher value of surface tension up to the point, at which within 2 seconds the line of fluid turns into separate droplets. If already at the starting point (38 mN/m (dyne/cm)) droplets are formed from the line of fluid, the check is continued with test inks/test pens of lower values, which is often the case with metals. As a general limit often 32 mN/m (dyne/cm) are mentioned: If the surface energy level is below this value, the adhesion will be poor, above this value the adhesion will be good or sufficient.

Sheet hardness properties are measured according to ASTM D2240-05. The tensile properties are determined according to standard test method ASTM D638-03.

Melt tension is measured on selected polymer samples on a Goettfert Rheotens melt tensile tester at a temperature of 190 C. The Rheotens tester is composed of two counter rotating wheels which pull a molten strand extruded from a capillary die at a constant velocity. The wheels are equipped with a balance to measure the stress response of the melt as the wheels accelerate. The wheels are allowed to accelerate until strand rupture. The force to break the strand is taken as the melt tension in centiNewton (cN).

RR ($V_{0.1}$, $V_{100}$) is determined by examining samples using melt rheology techniques on a Rheometric Scientific, Inc. ARES (Advanced Rheometric Expansion System) dynamic mechanical spectrometer (DMS). The samples are examined at 190 C, using the dynamic frequency mode and 25 millimeter (mm) diameter parallel plate fixtures with a 2 mm gap. With a strain rate of 8% and an oscillatory rate that is incrementally increased from 0.1 to 100 rad/sec, five data points are taken for each decade of frequency analyzed. Each sample (either pellets or bale) is compression molded into 3 inch (1.18 centimeter (cm)) diameter plaques by ⅛ inch (0.049 cm) thick at 20,000 psi (137.9 megapascals (MPa)) pressure for 1 minute at 180 C. The plaques are quenched and cooled (over a period of 1 minute) to room temperature. 25 mm plaques are cut from the center portion of larger plaques. These 25 mm diameter aliquots are then inserted into the ARES at 190 C, and allowed to equilibrate for five minutes prior to initiation of testing. The samples are maintained in a nitrogen environment throughout the analyses to minimize oxidative degradation. Data reduction and manipulation are accomplished by the ARES2/A5:RSI Orchestrator Windows 95 based software package. RR measures the ratio of the viscosity versus shear rate curve.

Interpolymer Mooney Viscosity, MV, (ML 1+4 at 125° C.) is measured in accordance with ASTM D1646-94. The processing rheology ration, PRR, is calculated from the MV and the RR in accordance with the formula provided above. ML refers to Mooney Large Rotor. This Mooney Viscosity may also be measured in accordance with the current test method, ASTM D1646-04. The viscometer is a Monsanto MV2000 instrument.

Resins:

TPU-1: Polybutadiene diol based TPU having a Tg of −34 C, specific gravity @ 25 C of 0.995, tensile strength of 1711 psi, $I_2$ of 1, hard segment content of 35 wt %, softening point of 90 C, and 559% elongation available from Sartomer Company, Inc.

TPU-2: Polybutadiene diol based TPU having a Tg of −35 C, specific gravity @ 25 C of 0.96, tensile strength of 975 psi, $I_2$ of 1, hard segment content of 27 wt %, softening point of 75 C, and 560% elongation available from Sartomer Company, Inc.

TPU-3: Polybutadiene-based thermoplastic polyurethane having a density less than 1 g/cm$^3$, Tg of −35° C., and $I_2$ of 17 available from Sartomer Company, Inc.

TPU-4: PELLETHANE™ 2102-80A, a thermoplastic polyurethane elastomer (polyester) having a density of 1.18 g/cm$^3$ and a MFR 190 C/8.7 kg 4 g/10 min and made by The Dow Chemical Company.

EAO-1: ENGAGE™ 7086 or ENR 7086.01, an ethylene/1-butene elastomer having a density of 0.901 g/cm$^3$ and 0.5 $I_2$ made by The Dow Chemical Company.

EAO-2: ENGAGE™ 7447, an ethylene/1-butene elastomer having a density of 0.865 g/cm$^3$ and 5 $I_2$ made by The Dow Chemical Company.

EAO-3: ENGAGE™ 7256 an ethylene/1-butene elastomer having a density of 0.885 g/cm$^3$ and 2.0 $I_2$ made by The Dow Chemical Company.

EAO-4: ENGAGE™ 8440 an ethylene/1-octene elastomer having a density of 0.897 g/cm$^3$ and 1.6 $I_2$ made by The Dow Chemical Company.

EAO-5: ENGAGE™ 8200 an ethylene/1-octene elastomer having a density of 0.87 g/cm$^3$ and 5 $I_2$ made by The Dow Chemical Company.

EAO-6: AFFINITY™ 1880 G an ethylene/α-olefin plastomer having a density of 0.902 g/cm$^3$ and 1 $I_2$ made by The Dow Chemical Company.

EAO-7: ENGAGE™ 8407: an ethylene/octene copolymer having a density of 0.87 g/cm$^3$ and 30 $I_2$ made by The Dow Chemical Company.

EAO-8: LDPE 662i, a low density ethylene polymer having a density of 0.919 g/cm$^3$ and 0.47 $I_2$ made by The Dow Chemical Company.

PE-1: Propylene-ethylene copolymer having a density of 0.858 g/cm$^3$ and 2 MFR made by The Dow Chemical Company.

PE-2: Propylene-ethylene copolymer having a density of 0.876 g/cm$^3$ and 8 MFR made by The Dow Chemical Company.

PE-3: Propylene-ethylene copolymer having a density of 0.888 g/cm$^3$ and 2 MFR made by The Dow Chemical Company.

PE-4: Propylene-ethylene copolymer having a density of 0.866 g/cm$^3$ and 8 MFR made by The Dow Chemical Company.

PE-5: Propylene-ethylene copolymer having a density of 0.866 g/cm$^3$ and 2 MFR) made by The Dow Chemical Company.

PE-6 Propylene-ethylene copolymer having a density of 0.866 g/cm$^3$ and 25 MFR) made by The Dow Chemical Company.

OBC-1: Ethylene/ethylene-octene block copolymer having an overall density of 0.877 g/cm$^3$ and an overall $I_2$ of 1 with a 70% soft (density 0.854 g/cm$^3$)/30% hard (density of 0.935 g/cm$^3$, $I_2$ of 1 g/10 min) block split made by The Dow Chemical Company.

OBC-2: Ethylene/ethylene-octene block copolymer having an overall density of 0.877 g/cm$^3$ and an overall $I_2$ of 1 with a 85% soft (density 0.855 g/cm$^3$)/15% hard (density of 0.935 g/cm$^3$, $I_2$ of 5.2 g/10 min) block split made by The Dow Chemical Company.

FP-1: AMPLIFY™ EA 100, ethylene ethyl acrylate (EEA) copolymer having a density of 0.930 g/cm$^3$ and 1.3 $I_2$ with 15% ethyl acrylate comonomer, made by The Dow Chemical Company.

FP-2: AMPLIFY™ EA 101, ethylene ethyl acrylate (EEA) copolymer having a density of 0.931 g/cm$^3$ and 6 $I_2$ with 18.5% ethyl acrylate comonomer, made by The Dow Chemical Company.

GEAO-1: ENGAGE™ 8407 grafted with MAH, an ethylene/1-octene copolymer having a density of 0.87 g/cm$^3$ and 30 $I_2$ before grafting with 0.74 wt % maleic anhydride made by The Dow Chemical Company.

EXAMPLE 1

High-Frequency Welding

Sheets comprising various blends of olefinic and polar polymers are prepared and tested for HF weldability. The composition of the blends and the results of the weldability tests are reported in Table Ex. 1. Blend A and B are compounded and pelletized using a twin screw extruder. The extruder temperature is set at 130/160/170/175/175/170 C with a screw speed of 50 rpm. Blends A and B are then melted and made into 0.3 mm thick film using a laboratory two roll mills at a mill temperature of 140 C. Blends C, D and E are compounded using a Haake machine at 160 C for 5 minutes. Blended polymers are made into films using a compression molding machine. 7.5 g of polymer blend is placed between two molding steel plates, with two polyester sheets to separate the mold plates and the sample. The compression molding machine is set to 180 C, and the polymer blend is compressed under a force of 10000 lbf for 1 minute to produce a film with about 300-350 μm thickness.

The welding conditions include a welding time of 4 seconds, power setting of 80% (i.e., the power input of the High Frequency Welding Machine from Sanden Electronic Equipment, Model KS-4000T), and the oscillation frequency of the machine is 27.12 MHz.

TABLE EX. 1

Sheets Comprising Olefinic and Polar Polymer Blends and HF-Weldability Test Results

| Ingredient | Example A | B | C | D | E | F | G |
|---|---|---|---|---|---|---|---|
| TPU-1 | 10 | 25 | 0 | 0 | 0 | | |
| EAO-1 | 90 | 75 | | | | | |
| Olefinic elastomer 2 | | | 100 | 70 | 70 | | |
| Olefinic elastomer 3 | | | | | | 90 | |
| Olefinic elastomer 4 | | | | | | | 90 |
| FP-1 | | | | 30 | | | |
| FP-2 | | | | | 30 | | |
| Advera 401PS (Zeolite) | | | | | | 10 | 10 |
| Test Results - HF-Weldability | Good | Good | Fail | Fail | Fail | Fail | Fail |

Olefinic elastomer 2: A 60/40 blend of PE-1 and PE-2.
Olefinic elastomer 3: A 40/30/30 blend of EAO-2, EAO-3 and EAO-4.
Olefinic elastomer 4: A 30/20/50 blend of PE-3, PE-4 and EAO-2.
ADVERA 401PS, an aluminosilicate hydrated zeolite sodium A powder made by PQ Corporation of Valley Forge, PA.

The calendared films or sheets comprising 10 and 25 wt % TPU-1 and 90 and 75 wt % EAO-1, respectively, exhibit compatibility of the composition components and HF-weldability. In contrast, the films without a polar component, e.g., Sample C, or with an EEA (Samples D and E) or zeolite (Samples F and G) polar component, have less desirable weldability.

EXAMPLE 2

Paintability

Blends of EAO-5 and TPU-3 pellets are formulated on a Werner-Pfleider ZSK-25 compound extruder using a flat temperature profile of 170 C. The pellets are fed via a separate loss-in-weight feeder to the extruder. The blend formulations are reported in Table Ex. 2-1

TABLE EX. 2-1

Compositions of Selected Injection Molded Plaques
Sample Composition

63:37 EAO-5:TPU-3
75:25 EAO-5:TPU-3
85:15 EAO-5:TPU-3

The formulations are injection molded as plaques 20 mil thick on a Cincinnati-Molder at a melt temperature of 408 F, a mold temperature of 80 F, and an injection speed of 2 inches/second. These plaques are then painted with the different paints identified in the description of FIG. 2 and allowed to dry overnight.

The plaques are then subjected to a cross-hatch test using a Model P.A.T. Paint Adhesion Test Kit from Paul N. Gardner Company, Inc. The kit contains all of the tools and materials needed, except for the multi-tooth cutter blade, for conducting adhesion tests on paints applied to a flat, uniform surface in accordance with ASTM D-3359, Method B and DIN Standard No. 53151. FIG. 1 is used to classify the results. A cross-hatch pattern is cut into the plaques. Sufficient force is used for the blade to cut completely through the coating and then a tape (Permacel #99 Adhesion Test Tape available from Permacel, a Nitto Denko Company) is used to peel off the paint in the cross-hatch pattern. If the tape is able to peel off a lot of the paint (a classification of 2 or less on FIG. 1), it implies that the adhesion between the paint and the substrate is poor. If, however, the tape is unable to peel off the paint, a good adhesion is demonstrated. The correlation between the classifications of FIG. 1 and the amount of paint removed (in wt %) is reported in Table Ex. 2 2.

TABLE EX. 2-2

Correlation Between FIG. 1 Classifications
and Paint Removed in Weight Percent

| Classification | Paint Removed Weight Percent |
|---|---|
| 0 | >65 |
| 1 | 35-65 |
| 2 | 15-35 |
| 3 | 5-15 |
| 4 | <5 |
| 5 | 0 |

FIG. 2 shows the painted injection molded plaques after being subjected to a cross-hatch paint adhesion test. In FIG. 2 the plaques on the right are painted with a Krylon® flat finish FUSION plastic paint for polyvinylchloride plastics, wood, metal, glass and ceramic. The solvent of this paint contains ketones, toluene, naphtha, xylene, and 2-butoxyethanol. The plaques on the left are painted with a water-based acrylic paint from Anita's™ 11304.

As is clear from FIG. 2, the 63:37 blend of EAO-5 and TPU-3 provides the best adhesion to the paint used in this study. The 85:15 blends show poor adhesion and the 75/25 blends show intermediate adhesion.

Numerous other blends are also tested using the same procedure, ASTM D-3359 and FIG. 1 classification chart as described above, except the injection molded plaques are replaced with extruded sheets. The results are reported in Table Ex. 2-3. All ratings below 3 are considered fail, and ratings of 3, 4 or 5 are considered pass.

The examples in Table Ex. 2-3 (extruded sheets) and Table Ex. 3 (injection molded plaques) show the influence of the amount of pd-TPU and temperature in obtaining good paint adhesion. Those skilled in the art will be able to vary the processing temperatures to obtain desired results. As shown in these Tables, lower amounts of pd-TPU in the formulations generally decreases paint adhesion. However under certain processing conditions and paint compositions (not limited to those shown in the Tables) lower amounts of pd-TPUs also pass the paint adhesion test.

The comparative examples with TPU-4 of Table 2.3 show that although compatibilization can be achieved between the polar TPU-4 and the np-PO as disclosed in the art by using grafted resins with functionalities, paint adhesion is not achieved.

TABLE EX. 2-3

Paintability Test Results

| Sample No. | Composition | Temp (C.) | Surface Energy (Pens) (dyne/cm) | Paint Adhesion | | |
|---|---|---|---|---|---|---|
| | | | | Paint 1[1] | Paint 2[2] | Paint 3[3] |
| C-1-A | EAO-1 | 170 | 30 | 0 | 0 | 0 |
| 1-A-1 | 85:15 EAO-1:TPU-1 | 170 | 36 | 0 | 1 | 1 |
| 1-A-2 | 85:15 EAO-1:TPU-1 | 190 | 36 | 0 | 3 | 1 |
| 1-A-3 | 85:15 EAO-1:TPU-1 | 210 | 38 | 2 | 4 | 4 |
| 1-B-1 | 75:25 EAO-1:TPU-1 | 170 | 38 | 4 | 4 | 4 |
| 1-B-2 | 75:25 EAO-1:TPU-1 | 190 | 38 | 3 | 4 | 4 |
| 1-B-3 | 75:25 EAO-1:TPU-1 | 210 | 38 | 4 | 4 | 4 |
| 1-C-1 | 70:30 EAO-1:TPU-1 | 170 | 36 | 4 | 4 | 4 |
| 1-C-2 | 70:30 EAO-1:TPU-1 | 190 | 38 | 4 | 4 | 4 |
| 1-C-3 | 70:30 EAO-1:TPU-1 | 210 | 38 | 4 | 4 | 4 |
| 1-D-1 | 63:37 EAO-1:TPU-1 | 170 | 38 | 4 | 4 | 4 |
| 1-D-2 | 63:37 EAO-1:TPU-1 | 190 | 38 | 4 | 4 | 4 |
| 1-E-1 | 63:37 EAO-1:TPU-2 | 170 | 36 | 2 | 3 | 4 |
| 1-E-2 | 63:37 EAO-1:TPU-2 | 190 | 36 | 2 | 4 | 4 |
| 1-E-3 | 63:37 EAO-1:TPU-2 | 210 | 36 | 4 | 4 | 2 |
| 1-F-1 | 75:25 EAO-1:TPU-2 | 170 | 32 | 0 | 0 | 0 |

TABLE EX. 2-3-continued

Paintability Test Results

| Sample No. | Composition | Temp (C.) | Surface Energy (Pens) (dyne/cm) | Paint Adhesion Paint 1[1] | Paint 2[2] | Paint 3[3] |
|---|---|---|---|---|---|---|
| 1-F-2 | 75:25 EAO-1:TPU-2 | 190 | 36 | 0 | 4 | 2 |
| 1-F-3 | 75:25 EAO-1:TPU-2 | 210 | 36 | 0 | 4 | 4 |
| 1-G-1 | 85:15 EAO-1:TPU-2 | 170 | 34 | 0 | 0 | 3 |
| 1-G-2 | 85:15 EAO-1:TPU-2 | 190 | 32 | 0 | 0 | 0 |
| 1-G-3 | 85:15 EAO-1:TPU-2 | 210 | 30 | 0 | 0 | 0 |
| 1-H-1 | 63:37 EAO-5:TPU-1 | 170 | 32 | 0 | 0 | 0 |
| 1-H-2 | 63:37 EAO-5:TPU-1 | 190 | 34 | 1 | 4 | 2 |
| 1-H-3 | 63:37 EAO-5:TPU-1 | 200 | 34 | 2 | 4 | 2 |
| 1-I-1 | 75:25 EAO-5:TPU-1 | 170 | 32 | 0 | 0 | 0 |
| 1-I-2 | 75:25 EAO-5:TPU-1 | 190 | 32 | 0 | 3 | 0 |
| 1-I-3 | 75:25 EAO-5:TPU-1 | 200 | 34 | 1 | 3 | 1 |
| 1-J-1 | 85:15 EAO-5:TPU-1 | 170 | 32 | 0 | 1 | 0 |
| 1-J-2 | 85:15 EAO-5:TPU-1 | 190 | 32 | 1 | 2/1 | 0 |
| 1-J-3 | 85:15 EAO-5:TPU-1 | 200 | 32 | 1 | 2 | 1 |
| 1-K-1 | 63:37 EAO-5:TPU-3 | 170 | 34 | 0 | 0 | 1 |
| 1-K-2 | 63:37 EAO-5:TPU-3 | 190 | 34 | 4 | 4 | 4 |
| C-1-B | EAO-5 | 190 | 30 | 0 | 0 | 0 |
| C-2-A | EAO-6 | 190 | 30 | 0 | 0 | 0 |
| 2-A-1 | 63:37 EAO-6:TPU-1 | 170 | 36 | 1 | 3 | 4 |
| 2-A-2- | 63:37 EAO-6:TPU-1 | 190 | 38 | 4 | 4 | 4 |
| 2-A-3 | 63:37 EAO-6:TPU-1 | 210 | 34 | 4 | 4 | 4 |
| 2-A-4 | 63:37 EAO-6:TPU-1 | 200 | 36 | 4 | 4 | 1 |
| 2-B-1 | 75:25 EAO-6:TPU-1 | 170 | 36 | 0 | 4/3 | 3 |
| 2-B-2 | 75:25 EAO-6:TPU-1 | 190 | 38 | 0 | 4 | 4 |
| 2-B-3 | 75:25 EAO-6:TPU-1 | 210 | 32 | 1 | 3 | 3 |
| 2-B-4 | 75:25 EAO-6:TPU-1 | 200 | 38 | 0 | 4/3 | 2 |
| 2-C-1 | 85:15 EAO-6:TPU-1 | 170 | 34 | 0 | 0 | 1 |
| 2-C-2 | 85:15 EAO-6:TPU-1 | 190 | 36 | 0 | 0 | 1 |
| 2-C-3 | 85:15 EAO-6:TPU-1 | 210 | 34 | 1 | 2 | 3 |
| 2-C-4 | 85:15 EAO-6:TPU-1 | 200 | 36 | 0 | 0 | 0 |
| 2-D-1 | 63:37 EAO-6:TPU-3 | 170 | 38 | 3 | 4 | 4 |
| 2-D-2 | 63:37 EAO-6:TPU-3 | 190 | 36 | 4 | 4 | 4 |
| 2-D-3 | 63:37 EAO-6:TPU-3 | 210 | 36 | 2 | 4 | 4 |
| 2-E-1 | 50:50 EAO-6:TPU-1 | 170 | 34 | 0 | 0 | 2 |
| 2-E-2 | 50:50 EAO-6:TPU-1 | 190 | 36 | 4 | 4 | 4 |
| 2-E-3 | 50:50 EAO-6:TPU-1 | 210 | 36 | 4 | 4 | 4 |
| C-3-A | PE-5 | 210 | 30 | 0 | 0 | 0 |
| 3-A-1 | 50:50 PE-5:TPU-1 | 170 | 38 | 2 | 4 | 4 |
| 3-A-2 | 50:50 PE-5:TPU-1 | 190 | 36 | 4 | 1 | 3 |
| 3-B-1 | 63:37 PE-5:TPU-1 | 170 | 34 | 4 | 4 | 4 |
| 3-B-2 | 63:37 PE-5:TPU-1 | 190 | 34 | 4 | 4 | 3 |
| 3-B-3 | 63:37 PE-5:TPU-1 | 210 | 34 | 4 | 4 | 3 |
| 3-C-1 | 75:25 PE-5:TPU-1 | 170 | 32 | 4 | 3 | 3 |
| 3-C-2 | 75:25 PE-5:TPU-1 | 190 | 34 | 4 | 4 | 3 |
| 3-C-3 | 75:25 PE-5:TPU-1 | 210 | 34 | 4 | 4 | 4 |
| 3-D-1 | 63:37 PE-5:TPU-2 | 170 | 36 | 4 | 4 | 4 |
| 3-D-2 | 63:37 PE-5:TPU-2 | 190 | 34 | 4 | 0 | 4 |
| 3-E-1 | 63:37 PE-3:TPU-1 | 170 | 34 | 4 | 1 | 4 |
| 3-E-2 | 63:37 PE-3:TPU-1 | 190 | 34 | 4 | 2 | 4 |
| 3-E-3 | 63:37 PE-3:TPU-1 | 210 | 36 | 4 | 3 | 4 |
| 3-F-1 | 63:37 PE-5:TPU-3 | 170 | 36 | 4 | 4 | 1 |
| 3-F-2 | 63:37 PE-5:TPU-3 | 190 | 34 | 4 | 4 | 4 |
| C-4-A | OBC-1 | 190 | 30 | 0 | 0 | 0 |
| 4-A-1 | 63:37 OBC-1:TPU-1 | 170 | 36 | 3 | 4 | 4 |
| 4-A-2 | 63:37 OBC-1:TPU-1 | 190 | 36 | 4 | 4 | 4 |
| 4-B-1 | 63:37 OBC-1:TPU-3 | 170 | 34 | 4 | 4 | 4 |
| 4-B-2 | 63:37 OBC-1:TPU-3 | 190 | 36 | 4 | 4 | 4 |
| 4-C-1 | 63:37 OBC-2:TPU-3 | 170 | 36 | 3 | 4 | 3 |
| 4-C-2 | 63:37 OBC-2:TPU-3 | 190 | 36 | 3 | 4 | 3 |
| C-4-B | INFUSE D9100 | 175 | N/M | 0 | N/M | N/M |
| C-4-C | 73.5:24.5:2 OBC-1:TPU-1:Ebony Color Concentrate | 175 | N/M | 4 | N/M | N/M |
| C-4-D | 61.8:36.2:2 OBC-1:TPU-1:Ebony Color Concentrate | 175 | N/M | 4 | N/M | N/M |
| C-4-E | 83.4:14.7:2 OBC-1:EAO-8:Ebony Color Concentrate | 175 | N/M | 0 | N/M | N/M |
| C-4-F | 62.5:20.8:14.7:2 OBC-1:TPU-1:EAO-8:Ebony Color Concentrate | 175 | N/M | 4 | N/M | N/M |
| C-4-G | 52.5:30.8:14.7:2 OBC-1:TPU-1:EAO-8:Ebony Color Concentrate | 175 | N/M | 4 | N/M | N/M |

TABLE EX. 2-3-continued

Paintability Test Results

| Sample No. | Composition | Temp (C.) | Surface Energy (Pens) (dyne/cm) | Paint 1[1] | Paint 2[2] | Paint 3[3] |
|---|---|---|---|---|---|---|
| | Other Technologies | | | | | |
| 5-A-1 | 53% EAO-1, 37% TPU-4, 10% GEAO-1 | 170 | 32 | 0 | 0 | 0 |
| 5-A-2 | 53% EAO-1, 37% TPU-4, 10% GEAO-1 | 190 | 32 | 0 | 0 | 2 |
| 5-A-3 | 53% EAO-1, 37% TPU-4, 10% GEAO-1 | 210 | 32 | 0 | 0 | 1 |

[1] Low's Valspar ® Plastic Enamel (Contains Acetone and Xylenes)
[2] Anita's Permanent Acrylic Water-Based Paint
[3] Model Master Custom Spray Enamel from Testor Corp Number 2913
N/M—Not measured.

EXAMPLE 3

Paintability—Injection Molding

Table Ex. 3 reports the paintability of various injection-molded plaques made from the reported blends and subsequently painted with the reported paints. The adhesion of the paints to the plaques is tested using the same procedure, ASTM D-3359 and FIG. 1 classification chart as described above. All ratings below 3 are considered failed, and ratings of 3, 4 or 5 are considered passed.

TABLE EX. 3

Paintability of Injection Molded Plaques

| Sample Number | Composition | Comments | Surface energy (dyne/cm) | Anita's permanent acrylic water-based paint | Model Master Custom Spray Enamel from Testor Corp Number 2913 | Krylon | Lowe's Valspar ® Plastic Enamel (Contains acetone and xylenes) |
|---|---|---|---|---|---|---|---|
| 3-A-1 | 63:37 EAO-5:TPU-1 | 200 C., 2 in/sec | 34 | 4 | 2 | 1 | 2 |
| 3-A-2 | 63:37 EAO-5:TPU-1 | 200 C., 3.69 in/sec | 34 | 4 | 2 | 3 | 2 |
| 3-A-3 | 63:37 EAO-5:TPU-1 | 225 C., 2 in/sec | 34 | 4 | 2 | 2 | 1 |
| 3-A-4 | 63:37 EAO-5:TPU-1 | 225 C., 3.69 in/sec | 34 | 4 | 3 | 1 | 2 |
| 3-B-1 | 75:25 EAO-5:TPU-1 | 200 C., 2 in/sec | 32 | 2 | 2 | 0 | 1 |
| 3-B-2 | 75:25 EAO-5:TPU-1 | 200 C., 3.69 in/sec | 32 | 3 | 2 | 0 | 1 |
| 3-B-3 | 75:25 EAO-5:TPU-1 | 225 C., 2 in/sec | 34 | 3 | 2 | 0 | 1 |
| 3-B-4 | 75:25 EAO-5:TPU-1 | 225 C., 3.69 in/sec | 34 | 3 | 1 | 0 | 1 |
| 3-C-1 | 63:37 EAO-7:TPU-3 | 200 C., 2 in/sec | 34 | 3 | 3 | 2 | 2 |
| 3-C-2 | 63:37 EAO-7:TPU-3 | 200 C., 3.69 in/sec | 34 | 4 | 3 | 2/1 | 2 |
| 3-C-3 | 63:37 EAO-7:TPU-3 | 225 C., 2 in/sec | 34 | 3 | 3 | 0 | 2 |
| 3-J-3 | 75:25 EAO-5:TPU-3 | 225 C., 2 in/sec | 34 | 4 | 2 | 0 | 0 |
| 3-J-4 | 75:25 EAO-5:TPU-3 | 225 C., 3.69 in/sec | 34 | 4 | 3 | 0 | 1 |
| 3-K-1 | 63:37 PE-5:TPU-2 | 210 C., 2 in/sec | 34 | 4 | 3 | 4 | 4 |
| 3-L-1 | 63:37 OBC-2:TPU-3 | 200 C., 2 in/sec | 34 | 4 | 2 | 0 | 2 |
| 3-L-2 | 63:37 OBC-2:TPU-3 | 200 C., 3.69 in/sec | 34 | 3 | 2 | 1 | 2 |
| 3-L-3 | 63:37 OBC-2:TPU-3 | 225 C., 2 in/sec | 34 | 3 | 2 | 1 | 2 |
| 3-L-4 | 63:37 OBC-2:TPU-3 | 225 C., 3.69 in/sec | 34 | 3 | 3 | 0 | 1 |
| 3-M-1 | 75:25 OBC-2:TPU-3 | 200 C., 2 in/sec | 32 | 4 | 2 | 0 | 1 |
| 3-M-2 | 75:25 OBC-2:TPU-3 | 200 C., 3.69 in/sec | 32 | 4 | 0 | 0 | 1 |
| 3-M-3 | 75:25 OBC-2:TPU-3 | 225 C., 2 in/sec | 32 | 4 | 2 | 0 | 1 |
| 3-M-4 | 75:25 OBC-2:TPU-3 | 225 C., 3.69 in/sec | 34 | 4 | 1 | 0 | 1 |
| 3-N-1 | 63:37 PE-4:TPU-3 | 210 C., 2 in/sec | 32 | 4/3 | 4 | 0/1 | 3 |
| 3-O-1 | 85:15 PE-4:TPU-3 | 210 C., 2 in/sec | 32 | 2/1 | 2 | 0 | 3 |
| 3-P-1 | 50:50 PE-5:TPU-1 | 210 C., 2 in/sec | 34 | 4 | 4 | 4 | 4 |
| 3-Q-1 | 63:37 PE-5:TPU-3 | 210 C., 2 in/sec | 34 | 4 | 3 | 4 | 4 |
| 3-Q-2 | 63:37 PE-6:TPU-3 | 210 C., 2 in/sec | 32 | 4/3 | 1 | 0 | 3 |
| 3-R-1 | PE-4 | 210 C., 2 in/sec | <28 | 0 | 1 | 0 | 2 |
| 3-R-2 | PE-6 | 210 C., 2 in/sec | <28 | 0 | 0 | 0 | 1 |
| 3-S-1 | EAO-7 | 210 C., 2 in/sec | <28 | 0 | 0 | 0 | 2 |
| 3-T-1 | OBC-2 | 210 C., 2 in/sec | <28 | 0 | 0 | 0 | 1 |

EXAMPLE 4

Over-Molding

Half tensile bars of nylon Capron 125 mil thick were injection molded under the conditions shown in Table Ex. 4-1. These nylon tensile bars were then put back in the mold and a blend of EAO-1 and TPU-1 was over-molded as the other half tensile bar.

TABLE EX. 4-1

Conditions at which the Tensile Bars of Nylon and EAO-1/TPU-1 Blend are Molded and Over-Molded Respectively

|  | Nylon | EAO-1/TPU-1 63/37 blend Sample 1 | Sample 2 |
|---|---|---|---|
| Barrel and Mold Temp (F.) | | | |
| Zone 1 | 420 | 350 | 350 |
| Zone 2 | 450 | 400 | 400 |
| Zone 3 | 475 | 420 | 420 |
| Zone 4 | 475 | 420 | 420 |
| Nozzle | 475 | 420 | 420 |
| Mold | 100 | 65 | 65 |
| Extruder | | | |
| RPM (m/min) | 15 | 30 | 30 |
| backpressure (bar) | 15 | 15 | 15 |
| Dosage (ccm) | 30 | 30 | 30 |
| Real dosage (ccm) | 32.4 | 32.4 | 32.6 |
| Optimal Injection | | | |
| Injection speed # 1 (cc/s) | 20 | 40 | 100 |
| Transfer position (ccm) | 15 | 15 | 15 |
| pressure at transfer (bar) | 474 | 380 | 804 |
| Fill time (sec) | 72 | 55 | 37 |
| Cushion (ccm) | 9 | 11.3 | 9.7 |
| Hold | | | |
| Pressure (bar) | 400 | 700 | 700 |
| Hold time (sec) | 20 | 30 | 30 |
| Time | | | |
| Cool time (sec) | 20 | 30 | 30 |
| Dosage time (sec) | 2.4 | 5.7 | 3.3 |
| Cycle time (sec) | 48.6 | 58.1 | 68.5 |

These tensile bars are pulled on an Instron machine. Table Ex. 4-2 shows the tensile strength at break (psi) and the ultimate elongation (%) for 10 tensile over-molded bars under two conditions. The first condition is a speed of injection of 40 cubic centimeters per second (cc/s). The second condition is an injection speed of 100 cc/s.

TABLE EX. 4-2

Tensile Strength and Break of Over-Molded Tensile Bars at an Injection Speed of 40 and 100 cc/s

|  | Tensile (break) (psi) | Ult. Elong % | Point of break |
|---|---|---|---|
| Sample 1 | | | |
| 1 | 967.9 | 7.2 | TPU-1/EAO-1 end |
| 2 | 959.4 | 7 | TPU-1/EAO-1 end |
| 3 | 468.4 | 25.1 | Center |
| 4 | 514.7 | 23.9 | Center |
| 5 | 635.5 | 30.4 | Center |
| 6 | 907.9 | 9.2 | TPU-1/EAO-1 end |
| 7 | 762.6 | 12.2 | Center |
| 8 | 468.3 | 20 | Center |
| 9 | 505.1 | 20 | Center |
| 10 | 446.1 | 22.7 | Center |
| 11 | 505.9 | 22.1 | Center |
| mean | 649.3 | 18.2 | Delamination in Center |
|  | 210.6 | 7.9 | |
| Sample 2 | | | |
| 1 | 881.6 | 11.7 | TPU-1/EAO-1 end |
| 2 | 996.1 | 10.5 | TPU-1/EAO-1 end |
| 3 | 1013.2 | 10.9 | TPU-1/EAO-1 end |
| 4 | 1007.2 | 11.9 | TPU-1/EAO-1 end |
| 5 | 1046.5 | 11.7 | TPU-1/EAO-1 end |
| 6 | 709.4 | 17.4 | TPU-1/EAO-1 end |
| 7 | 1020.8 | 10.6 | TPU-1/EAO-1 end |
| 8 | 478.1 | 24.7 | Center |
| 9 | 1141 | 15 | TPU-1/EAO-1 end |
| 10 | 1022 | 14.2 | TPU-1/EAO-1 end |
| mean | 931.7 | 13.9 | Good Overmolding |
|  | 196.5 | 4.4 | |

As is evident from Table Ex. 4-2, at an injection speed of 40 cc/s the over-mold delaminates at the center whereas at an injection speed of 100 cc/s, the over-mold remains intact but fails at the softer TPU-1/EAO-1 end of the tensile bar. This demonstrates adhesion of a non-polar polyolefin such as EAO-1 to a polar substrate such as nylon via melt blending of the EAO-1 with a compatible thermoplastic urethane.

Table Ex. 4-3 reports the over-moldability of various injection-molded plaques made from the reported blends and subsequently over-molded with the reported materials.

TABLE EX. 4-3

Over-Moldability of Injection-Molded Articles

| Blends/Controls | Capron (Nylon) | Magnum 3325 MT (ABS) | Calibre 200 (Polycarbonate) | Pellethane 2102-80A (TPU) |
|---|---|---|---|---|
| 63:37 EAO-1:TPU-1 | 100% Cohesive Failure | 100% Cohesive Failure | 100% Cohesive Failure | 100% Cohesive Failure |
| 75:25 EAO-1:TPU-1 | Adhesive Failure | — | — | — |
| 85:15 EAO-1:TPU-2 | Adhesive Failure | — | — | — |
| 63:37 EAO-5:TPU-3 | 50% Cohesive Failure | — | — | — |
| 63:37 EAO-7:TPU-3* | 50% Cohesive Failure | 50% Cohesive Failure | 50% Cohesive Failure | 50% Cohesive Failure |
| TPU-1 | 100% Cohesive Failure | — | — | — |
| TPU-4 | Adhesive Failure | — | — | — |
| PE-5 | Adhesive Failure | — | — | — |
| 50:50 PE-5:TPU-1 | Adhesive Failure | 100% Cohesive Failure | Adhesive Failure | Adhesive Failure |
| 63:37 PE-5:TPU-1 | Adhesive Failure | — | — | — |
| 63:37 PE-5:TPU-2 | Adhesive Failure | — | — | — |
| 63:37 PE-5:TPU-3 | Adhesive Failure | Adhesive Failure | Adhesive Failure | Adhesive Failure |
| 63:37 OBC-2:TPU-3* | 50% Cohesive Failure | 50% Cohesive Failure | 50% Cohesive Failure | 50% Cohesive Failure |

TABLE EX. 4-3-continued

Over-Moldability of Injection-Molded Articles

| Blends/Controls | Capron (Nylon) | Magnum 3325 MT (ABS) | Calibre 200 (Polycarbonate) | Pellethane 2102-80A (TPU) |
|---|---|---|---|---|
| EAO-1/TPU-4/MAH | 50% Cohesive Failure | — | — | — |
| EAO-1 | Adhesive Failure | — | — | — |

100% cohesive failure means that sample did not break at the interface but at the softer blend end
Adhesive failure means that sample broke at the interface without residue on the substrates
50% cohesive failure means that sample broke at the interface but left residue on the substrate
*Flashing and delamination on surface

EXAMPLE 5A

Blown Film (4-5 mil)

Monolayer blown films are extruded on a research line with a single screw extruder and with zone temperatures between 183-193 C with the melt temperature of 193 C. The thickness of the films blown is between 4-5 mil and flat-line width of 4.25 inches. The films were then painted and tested for adhesion using the same procedures as that reported for Example 2. The results are reported in Table Ex. 5A.

TABLE EX. 5A

Paintability of 4-5 mil Blown Film

| | Temp (C.) | Paint Adhesion | Surface energy (dyne/cm) |
|---|---|---|---|
| 63:37 OBC-1:TPU-1 | 193 | 4 | 36 |
| 50:50 PE-5:TPU-1 | 193 | 4 | 36 |

EXAMPLE 5B

Blown Film (1.8 and 1.2 mil)

Two monolayer blown films are separately extruded on a large pilot line with a single screw extruder and with zone temperatures between 188-193 C and a melt temperature of 193 C. The thickness of the first blown film (Sample No. SB-1) is 1.84 mil, and the thickness of the second blown film (Sample No. SB-2) is 1.19 mil. Both films are extruded from a blend of (i) 98 wt % pellets comprising a blend of 63 wt % EAO-1 and 37 wt % TPU-1, and (ii) 2 wt % of blue color concentrate from Americhem. The films are then tested for tensile, toughness and modulus in both the machine and transverse directions (MD and TD, respectively) according to ASTM D-882, Elmendorf tear in both MD and TD according to ASTM D-1922, and peel strength according to ASTM F-88. The density and surface energy of the film is also determined. The results are reported in Table Ex. 5B.

TABLE EX. 5B

Properties and Test Results of 1.84 and 1.19 mil Blown Film

| Property/Test | Sample No. 5B-1 | Standard Deviation | Sample No. 5B-2 | Standard Deviation |
|---|---|---|---|---|
| Thickness, mil | 1.84 | 0.11 | 1.19 | 0.11 |
| Density, g/cc | 0.9436 | 0.0009 | 0.9455 | 0.0005 |
| Dyne Level, dyne/cm | Pass 33 Fail 36 | NA | Pass 33 Fail 36 | NA |
| Tensile Stress at Break, MD, psi | 4,340 | 500 | 4,010 | 295 |
| Tensile Strain at Break, MD, % | 355 | 30 | 215 | 20 |
| Toughness, MD, psi | 9,185 | 1,390 | 6,070 | 760 |
| Tensile Stress at Break, TD, psi | 3,680 | 420 | 3,590 | 50 |
| Tensile Strain at Break, TD, % | 585 | 30 | 580 | 20 |
| Toughness, TD, psi | 9,735 | 1,300 | 9,430 | 240 |
| 1% Secant Modulus, MD. psi | 15,440 | 260 | 19,930 | 975 |
| 1% Secant Modulus, TD. psi | 15,450 | 910 | 17,090 | 670 |
| Elmendorf Tear, MD. grams/mil | 9 | 2 | 11 | 1 |
| Elmendorf Tear, TD. grams/mil | 35 | 3 | 29 | 1 |
| Maximum Peel Strength from Nylon 177 C., 5 seconds, 30 psi, lb/inch* | 0.55 | 0.07 | 0.85 | 0.09 |

*When bonded at 121 C. for 10 seconds at 30 psi; the film breaks during peel testing indicating that an intimate bond with the nylon fabric has formed.

EXAMPLE 6A

Aqueous Dispersions

Aqueous dispersions are prepared from various EAO-5 and TPU-3 blends. The dispersions are prepared by melt blending the blend and water in an extruder to produce a stable, uniform dispersion with an average particle size of 300 nm. The solids content of the dispersions is between 35 and 50 wt %. UNICID™ 350 surfactant/stabilizing agent (6 wt % on a solids basis; a synthetic $C_{2-6}$ carboxylic acid converted to potassium salt and available from Baker Petrolite) is added as a dispersing agent. Samples comprising a blend with a larger percentage of EAO-5 are prepared by adding additional EAO-5 to a dispersion with a lower percentage of EAO-5. The dispersions are then applied as a cast film to biaxially-oriented polypropylene (BOPP) film, and the surface energy measured. Table Ex. 6A reports the results.

TABLE EX. 6A

Surface Energy of Films Cast from Aqueous
dispersions of EAO-5/TPU-3 onto BOPP Film

| EAO-5/TPU-E (w/w) | Surface Energy (dyne/cm) |
|---|---|
| 63/37 | 48 |
| 75/25 | 48 |
| 80/20 | 36 |
| 85/15 | 36 |
| BOPP Film | <30 |

EXAMPLE 6B

Aqueous Dispersion

The dispersion of this example comprises 51.4 wt % solids, 3 wt % UNICID™ 350 surfactant/stabilizing agent, and water. The solids comprise 63 wt % of an ethylene/1-octene copolymer ($I_2$ of 5 and density of 0.87 g/cc) and 37 wt % TPU-3, and has a polydispersity of 5.46. The dispersion has a pH of 10.9, a viscosity (cp) of 30, an average particle size of 0.63 microns, and 90% of the surfactant was neutralized. The dispersion does not contain a wetting agent, i.e., a compound that would assist the flow and spread of the dispersion over the substrate. The dispersion is applied to the substrate with a paint brush and then allowed to dry at a temperature of about 70 C. If after a few minutes a dry film is observed that can not be easily delaminated from the substrate by hand, then it is concluded that sufficient adhesion exists between the substrate and the film.

The results are reported below. The first substrate is an extruded sheet of a peroxide-modified (lightly crosslinked) ethylene/1-octene copolymer. The next two substrates are a PET film and fabric, respectively, and the remaining two substrates are molded plaques of rigid thermoplastic polyurethane and PET respectively.

| SUBSTRATE | RESULT |
|---|---|
| X-linked EO copolymer | No Delamination |
| PET Film | No Delamination |
| PET Fabric | No Delamination |
| Rigid Polyurethane | No Delamination |
| PET | No Delamination |

EXAMPLE 6C

Aqueous Dispersion

One hundred parts by weight of EAO-5, 58.7 parts by weight of TPU-3, and 4.9 parts by weight of UNICID™ 350 surfactant/stabilizing agent are melt-kneaded at 165° C. in a twin screw extruder at a rate of 9.4 kg/hr. Onto the melt-kneaded resin 10.6 weight percent aqueous solution of potassium hydroxide is continuously fed into a downstream injection port of the extruder at a rate 0.3 kg/hr (i.e., at a rate of 26 wt % of the total mixture). This aqueous dispersion is subsequently diluted with additional water at a rate of 8.0 kg/hr before exiting the extruder. To further dilute the resulting dispersion, additional water is added at a rate of 1.2 kg/hr after the mixture has exited the extruder. An aqueous dispersion having a solids content of 50.6 wt % at a pH of 11.5 is obtained. The dispersed polymer phase as measured by a Coulter LS230 particle analyzer consists of an average volume diameter of 1.17 micron and a particle size distribution (Dv/Dn) of 2.35.

EXAMPLE 6D

Aqueous Dispersions

Aqueous dispersions are prepared from EAO-5, TPU-3, TPU-1 and various blends of these materials. With respect to the blends, the polymer pellets are fed directly to the extruder in the ratio reported in Table Ex. 6D with water to produce a stable, uniform dispersion with the average particle size and solids content also reported in the Table Ex. 6D. The solids content of the dispersions is between 35 and 50 wt % as reported in the Table Ex. 6D. UNICID™ 350 surfactant/stabilizing agent is added as a dispersing agent.

The dispersions are then applied to an OBC-2 plaque with a paint brush and heated at 85° C. to flash off water resulting in a thin film of the dispersion covering the plaque. Surface energy is measured after allowing the films to cool over 10 minutes. Lowe's Valspar® Plastic Enamel Paint is applied to the primed plaques and allowed to dry at room temperature for 24 hours. These plaques are subjected to a cross-hatch paint adhesion test and a rating is noted as previously described.

TABLE EX. 6D

Properties, Surface Energy and Cross-Hatch Ratings
Of Selected Aqueous Dispersions

| Sample | Particle size (μm) | Polydispersity | Solids content (%) | Surface energy (dyne/cm) | Cross-hatch paint rating |
|---|---|---|---|---|---|
| TPU-3 | 1.24 | 2.33 | 48.4 | 41 | 0 |
| TPU-1 | 0.67 | 1.39 | 50.5 | 44 | 0 |
| EAO-5 | 0.56 | 1.34 | 50.5 | 32 | 0 |
| 63:37 EAO-5:TPU-3 | 1.17 | 2.35 | 50.6 | 41 | 4 |
| 80:20 EAO-5:TPU-3 | 1.06 | 2.56 | 50.5 | 41 | 3 |
| 63:37 EAO-5:TPU-1 | 0.88 | 5.24 | 50.5 | 41 | 4 |
| 80:20 EAO-5:TPU-1 | 1.92 | 4.19 | 51.3 | 41 | 3 |

EXAMPLE 6E

Aqueous Dispersions

The TPU-3, TPU-1 and EAO-5 dispersions reported in Table Ex. 6D are physically blended in a ratio that results in a solids content of EAO-5 to the TPU reported in Table Ex. 6E. The physical blending is performed by pouring the two dispersions in the appropriate ratio in a 500 ml beaker with a magnetic stir bar and placing it on a stirring plate. The stirring proceeds for 30 minutes. These dispersions are then applied to OBC-plaques and flashed off at 85° C. for 10 minutes to form films. Surface energy and cross-hatch paint adhesion is conducted as in Example 6D.

TABLE EX. 6E

Surface Energy and Cross-Hatch Paint Ratings of Selected Dispersions

| Sample | Surface energy (dyne/cm) | Cross-hatch paint rating |
|---|---|---|
| 63:37 EAO-5:TPU-3 | 35 | 4 |
| 80:20 EAO-5:TPU-3 | 35 | 3 |
| 63:37 EAO-5:TPU-1 | 38 | 4 |
| 80:20 EAO-5:TPU-1 | 38 | 3 |

EXAMPLE 7

In-Line Compounded Sheet

An Egan 4.5-inch (30/1 length/diameter (L/d) ratio) two-stage single screw (Maddock-type) 3:1 compression ratio coupled to a Kenics static mixer, 114 cc Gard pump, 500 lb/hr through a 62-inch heavy gauge sheet die with restrictor bar and flex lips is used to in-blend 61.74 wt % EAO-1 with 36.26 wt % TPU-1 and 2% Americhem color concentrate (53170-H1-101, very dark cashmere). The EAO-1 and TPU-1 pellets are mixed and then fed by air conveying to the feed section of the screw. The blend is extruded into 40 mil (0.04 in.) thick sheet.

The process conditions include barrel temperatures of 152 C (305 F) in zone 1, 171 C (340 F) in zone 2, 193 C (380 F) in zones 3 and 4, and 204 C (400 F) in zone 5, and a melt, mixer and screen temperature of 199 C (390 F). The zones 1 to 5 die temperature is 204 C (400 F), extruder amps is 227, output percent is 32, pump temperature is 204 C (400 F), and pump speed is 24.5 rpm.

For comparative purposes the EAO-1 (61.74 wt %) and TPU-1 (36.26 wt %) and 2 wt % Americhem color concentrate (same as above) are pre-compounded on a WP-ZSK-25 twin screw co-rotating 48/1 (L/d) twin screw extruder, strand cut into pellets, dried for 4 hours at 70 C in a vacuum oven, and then extruded into 40 mil (0.04 in.) thick sheet.

Pre-compounding process conditions include barrel temperatures of 140 C (285 F) in zone 1; 171 C (340 F) in zones 2-5, 188 C (370 F) in zones 6 and 7, 191 C (375 F) in zone 8, and 227 C (440 F) melt temperature.

Sheet line extrusion conditions include a Killion 1.75 in., 24:1 L/D single screw extruder with a Davis Standard Barrier feed-screw with barrier transition section and Spiral Maddock mixing section. This feeds an Extrusion Dies Inc. 24 Ultraflex H75 die at 50 lbs/hr. Barrel temperatures include 177 (350 F) in zone 1, 191 C (375 F) in zone 2, 199 C (390 F) in zone 3, 210 C (410 F) in the adaptor, and 199 C (390 F) in die zones 1-3. The pump speed is 75 rpm, and the die pressure is 1000 psi. Selected properties of the two sheets are reported in Table Ex. 7.

TABLE EX. 7

Comparison of Selected Properties of In-Line Compounded and Pre-Compounded Extruded Sheets

| Physical Property | In-Line Compounded | Pre-Compounded |
|---|---|---|
| Sheet Density, g/cc | 0.945 | 0.943 |
| Tensile (MD), MPa | 13.8 | 7.5 |
| Elongation % (MD) | 540 | 450 |
| Surface Tension (dyne/cm) | 38 | 39 |

As the data of Table Ex. 7 shows, the compositions of this invention provide comparable, if not superior, results when in-line compounded as compared to pre-compounded. This, in turn, translates to more efficient processing by avoiding the need for a pre-compounding step.

Although the invention has been described in considerable detail in the preceding examples, this detail is for the purpose of illustration and is not to be construed as a limitation on the invention as described in the following claims. All U.S. patents and allowed U.S. patent applications or published U.S. patent applications are incorporated within this specification by reference.

What is claimed is:

1. An article comprising a first structural component and a second structural component, the first structural component comprising a polar material and the second structural component comprising a blend of 55 to 77 weight percent (wt %) homogeneously branched linear or homogeneously branched substantially linear ethylene α-olefin interpolymer and 45 to 23 wt % thermoplastic polydiene-based polyurethane and wherein the blend has a surface energy greater than, or equal to, 34 dyne/cm.

2. The article of claim 1 in which the polydiene-based polyurethane is a polydiene diol-based polyurethane (pd-TPU).

3. The article of claim 1 in which the ethylene α-olefin interpolymer has a molecular weight distribution from 1.5 to 4.5.

4. The article of claim 2 in which the ethylene α-olefin interpolymer is substantially linear.

5. The article of claim 3 in which the ethylene α-olefin interpolymer is an ethylene/α-olefin random interpolymer and the diisocyanate component of the polydiene-based polyurethane is an aliphatic diisocyanate.

6. The article of claim 4 in which the ethylene α-olefin interpolymer is an ethylene/α-olefin random interpolymer, the diol component of the polydiene diol polyurethane is at least partially hydrogenated, and the diisocyanate component of the polydiene diol polyurethane is an aliphatic diisocyanate.

7. A blend comprising (i) 55 to 77 weight percent (wt %) ethylene α-olefin multi-block copolymer, and (ii) 45 to 23 wt % thermoplastic polydiene-based polyurethane and wherein the blend has a surface energy greater than, or equal to, 34 dyne/cm.

8. The blend of claim 7 in which the polydiene-based polyurethane is polydiene diol-based polyurethane.

9. The blend of claim 7 in which the ethylene multi-block copolymer has a molecular weight distribution from 1.5 to 4.5.

10. The blend of claim 9 in which the diisocyanate component of the polydiene-based polyurethane is an aliphatic diisocyanate.

11. The blend of claim 9 in which the diol component of the polydiene diol-based polyurethane is at least partially hydrogenated, and the diisocyanate component of the polydiene diol-based polyurethane is an aliphatic diisocyanate.

12. An aqueous dispersion comprising water and from 30 to 70 wt % solids, based on the total weight of the dispersion, the solids comprising a blend of a homogeneously branched linear or homogeneously branched substantially linear ethylene α-olefin interpolymer and thermoplastic polydiene-based polyurethane, the blend comprising from 55 to 77 weight percent (wt %) of the homogeneously branched or substantially homogeneously branched ethylene α-olefin interpolymer and from 45 to 23 wt % of the polydiene-based polyurethane, the solids having an average particle size of from 0.4 to 2.5 microns and wherein the dispersion has a surface energy greater than, or equal to, 34 dyne/cm when measured as a film.

13. The dispersion of claim 12 in which the polydiene-based polyurethane is a polydiene diol-based polyurethane.

14. The dispersion of claim 12 in which the homogeneously branched linear or homogeneously branched substantially linear ethylene α-olefin interpolymer has a molecular weight distribution from 1.5 to 4.5.

15. The dispersion of claim 14 in which the diisocyanate component of the polydiene-based polyurethane is an aliphatic diisocyanate.

16. The dispersion of claim 13 in which the diol component of the polydiene diol-based polyurethane is at least partially hydrogenated, and the diisocyanate component of the polydiene diol-based polyurethane is an aliphatic diisocyanate.

17. An article comprising a first structural component and a second structural component, the first structural component comprising a polar material and the second structural component comprising a blend of a olefin multi-block interpolymer and a thermoplastic polydiene-based polyurethane wherein the blend comprises from 55 to 77 weight percent (wt %) of the olefin multi-block interpolymer and from 45 to 23 wt % of the polydiene-based polyurethane and wherein the blend has a surface energy greater than, or equal to, 34 dyne/cm.

* * * * *